United States Patent [19]

Yamada et al.

[11] Patent Number: 5,668,651

[45] Date of Patent: Sep. 16, 1997

[54] POLYMER-WALL LCD HAVING LIQUID CRYSTAL MOLECULES HAVING A PLANE-SYMMETRICAL BEND ORIENTATION

[75] Inventors: Nobuaki Yamada, Higashiosaka; Wataru Horie, Hashimoto; Toshiyuki Hirai, Kashihara; Shuichi Kozaki, Nara, all of Japan

[73] Assignee: Sharp Kabushiki Kaisha, Osaka, Japan

[21] Appl. No.: 394,472

[22] Filed: Feb. 27, 1995

[30] Foreign Application Priority Data

Mar. 18, 1994 [JP] Japan .................................. 6-049332
Sep. 30, 1994 [JP] Japan .................................. 6-237852

[51] Int. Cl.$^6$ .................... G02F 1/1335; G02F 1/1339
[52] U.S. Cl. .................................. 349/156; 349/117
[58] Field of Search .................... 359/81, 63, 73, 359/62, 51

[56] References Cited

U.S. PATENT DOCUMENTS

| | | | |
|---|---|---|---|
| 4,295,712 | 10/1981 | Ishiwatari | 359/81 |
| 4,579,423 | 4/1986 | Fergason | 359/52 |
| 4,596,445 | 6/1986 | Fergason | 359/49 |
| 4,662,720 | 5/1987 | Fergason | 359/52 |
| 4,671,618 | 6/1987 | Wu et al. | 359/52 |
| 4,815,826 | 3/1989 | Fergason | 359/52 |
| 4,818,070 | 4/1989 | Gunjima et al. | 359/594 |
| 4,890,902 | 1/1990 | Doane et al. | 359/52 |
| 5,089,904 | 2/1992 | Fergason | 359/52 |
| 5,103,326 | 4/1992 | Fergason | 359/51 |
| 5,194,975 | 3/1993 | Akatsuka et al. | 359/73 |
| 5,249,071 | 9/1993 | Yoshimizu et al. | 359/63 |
| 5,333,074 | 7/1994 | Hikmet | 359/51 |
| 5,401,437 | 3/1995 | Im | 359/51 |
| 5,450,220 | 9/1995 | Onishi et al. | 359/51 |
| 5,473,450 | 12/1995 | Yamada et al. | 359/51 |

FOREIGN PATENT DOCUMENTS

| | | | |
|---|---|---|---|
| 0 367 288 | 5/1990 | European Pat. Off. | 359/73 |
| 0568355 A2 | 11/1993 | European Pat. Off. | |
| 58-501631 | 9/1983 | Japan . | |
| 59-226322 | 12/1984 | Japan . | |
| 61-116329 | 6/1986 | Japan . | |
| 61-502128 | 9/1986 | Japan . | |
| 61-208034 | 9/1986 | Japan | 359/81 |
| 1-209424 | 8/1989 | Japan . | |
| 1-269922 | 10/1989 | Japan . | |
| 2-99920 | 4/1990 | Japan . | |

(List continued on next page.)

OTHER PUBLICATIONS

Saitoh et al, "A Reverse Pretilt N–LC Cell Provided with a High Pretilt Angle by Oblique Vapor Deposition of CeO$_2$", Japan Applied Physics Society Spring Meeting Preprints, Ip–R–8, 1980.

Shimada et al, "Imrpovement of Hysteresis in Polymer Dispersed Liquid Crystal)PDLC)by Control of Polymer Orientation", Japan Display '92.

Margerum et al, "Effects of Off–State Alignment in Polymer Dispersed Liquid Crystals", Liquid Crystals, vol. 5, No. 5, pp. 1477–1487, 1989.

*Primary Examiner*—Anita Pellman Gross
*Assistant Examiner*—Toan Ton
*Attorney, Agent, or Firm*—Nixon & Vanderhye P.C.

[57] ABSTRACT

A liquid crystal display device according to the present invention includes: a pair of electrode substrates including a plurality of pixels arranged in a matrix shape and an electrode formed on a surface of each electrode substrate, at least one of the surfaces being subjected to a rubbing treatment; a wall-like structure formed between the pair of electrode substrates, the wall-like structure including unit walls, and each unit wall corresponding to one of the plurality of pixels; and a liquid crystal layer at least partially partitioned by the wall-like structure and including liquid crystal regions between the pair of electrode substrates, each liquid crystal region corresponding to one of the plurality of pixels, wherein liquid crystal molecules in the liquid crystal regions have a plane-symmetrical orientation with respect to a plane taken in the middle of and in parallel to the electrode substrates, the liquid crystal molecules having a bend orientation.

23 Claims, 11 Drawing Sheets

FOREIGN PATENT DOCUMENTS

| | | |
|---|---|---|
| 2-153318 | 6/1990 | Japan . |
| 2-153319 | 6/1990 | Japan . |
| 6-160801 | 12/1990 | Japan . |
| 2-306217 | 12/1990 | Japan . |
| 3-61925 | 3/1991 | Japan . |
| 3-278024 | 12/1991 | Japan . |
| 4-31823 | 2/1992 | Japan . |
| 4-31824 | 2/1992 | Japan . |
| 4-188105 | 7/1992 | Japan . |
| 4-212928 | 8/1992 | Japan . |
| 4-338923 | 11/1992 | Japan . |
| 4-323616 | 11/1992 | Japan . |
| 5-11237 | 1/1993 | Japan . |
| 5-27242 | 2/1993 | Japan . |
| 5-281519 | 10/1993 | Japan . |
| 5-257135 | 10/1993 | Japan . |
| 6-160814 | 6/1994 | Japan . |
| WO 83/01016 | 3/1983 | WIPO . |
| WO 85/04262 | 9/1985 | WIPO . |

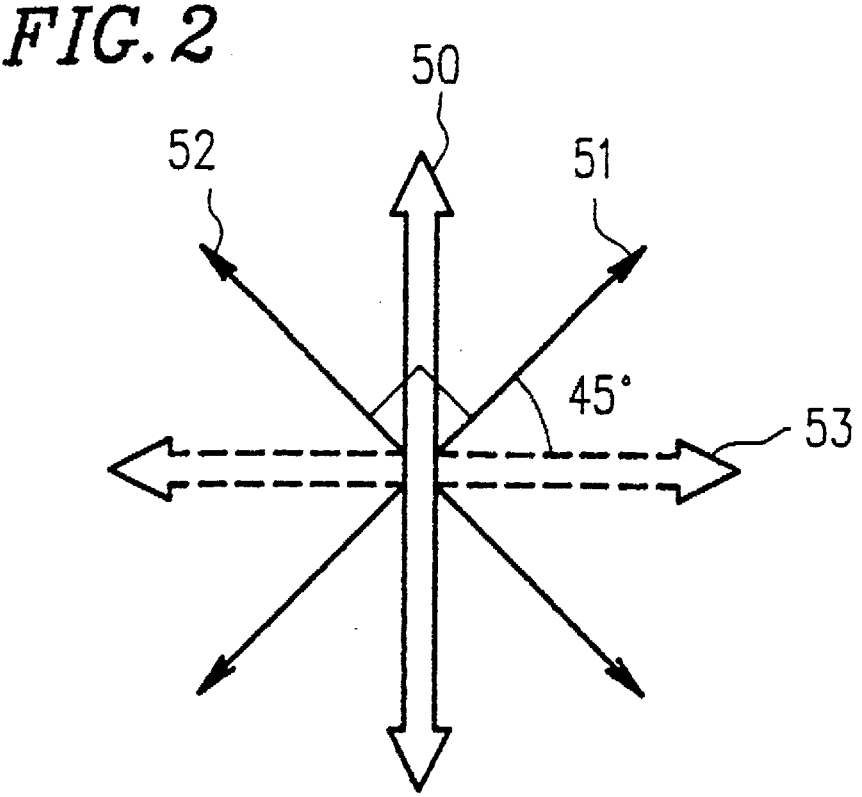

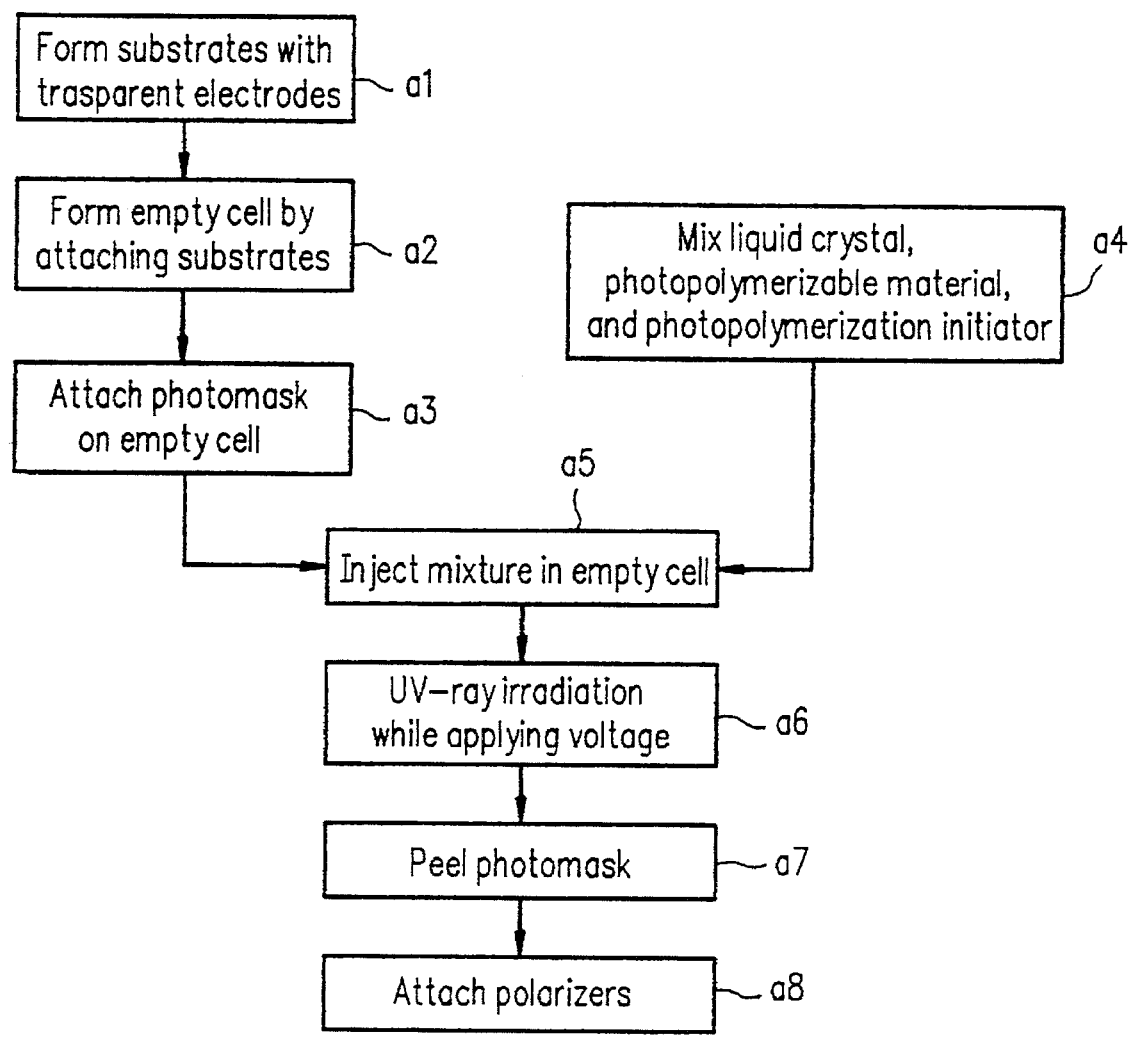
FIG. 3  Production steps for the liquid crystal display device according to the present invention a: Transmittance curve along molecular axis when 10V is applied b: Transmittance curve along axis direction of polarizer when 10V is applied

POLYMER-WALL LCD HAVING LIQUID CRYSTAL MOLECULES HAVING A PLANE-SYMMETRICAL BEND ORIENTATION

BACKGROUND OF THE INVENTION

1. Field of the Invention

The present invention relates to a liquid crystal display device (hereinafter referred to as a "π cell") including liquid crystal molecules which have a bend orientation and are at least partially partitioned by a polymer wall so as to correspond to pixels, and a method for producing the same.

2. Description of the Related Art

First, conventional techniques will be described below.

(π cells and the like)

FIGS. 14A and 14B schematically show an exemplary π cell 1 disclosed in Japanese Laid-Open Patent Publication No. 61-116329. As shown in FIG. 14A, the π cell 1 includes a pair of glass substrates 2 and 3, and a liquid crystal layer 4 interposed between the substrates 2 and 3. Liquid crystal molecules 5 in the liquid crystal layer 4 have a spray orientation when no voltage is applied. In this state, the liquid crystal molecules 5 are in a thermally stable state. If a voltage is applied to the π cell 1 under certain conditions by using a power source 6, the liquid crystal molecules 5 are oriented so as to have a bend orientation, as shown in FIG. 14B. In a bend orientation state, the liquid crystal molecules 5 have a reverse pre-tilt angle and a high pre-tilt angle, so that the liquid crystal molecules 5 can be easily driven by an external voltage with a high response speed, and only a low driving voltage is required. Moreover, in a bend orientation, the liquid crystal molecules 5 are located in plane-symmetrical positions with respect to a plane taken in the middle of and in parallel to the substrates 2 and 3. Accordingly, the π cell 1 constitutes a so-called "self-compensated cell", in which the liquid crystal molecules 5 function to compensate for one another. Thus, the π cell 1 provides viewing angle characteristics which are symmetrical along the left-right direction with respect to the π cell 1.

Moreover, Japanese Laid-Open Patent Publication Nos. 1-209424 and 2-306217 each disclose a structure in which a mono-axial optical compensated film composed of a mono-axially stretched polymer material is provided for a liquid crystal cell including a liquid crystal layer interposed between a pair of transparent substrates, the mono-axial optical compensated film being disposed perpendicular to longitudinal axes of liquid crystal molecules, and an effective retardation d•Δn of the liquid crystal cell and the retardation d•Δn of the mono-axial optical compensated film being substantially the same. This cell provides omnidirectional viewing angle characteristics.

However, since the above-mentioned liquid crystal cell has a structure in which a liquid crystal material is interposed between substrates with spacers being only partially added, a problem arises when an inputting operation is conducted by means of a pen-shaped input means for pressing a desired portion of a transparent position detection film provided on the surface of the liquid crystal cell. That is, the thickness of the cell varies owing to an external force such as that caused by an inputting operation with the pen-shaped input means (hereinafter referred to as "pen-inputting operation"), thereby leading to a display quality problem such as coarse displayed images. Moreover, the orientation state (bend state) of the π cell is not thermally stable, so that, when the application of a voltage is stopped, the orientation state may slowly return to the thermally stable spray orientation state. Therefore, when a π cell is adopted, an electric field is required in order to maintain the bend orientation state, thereby resulting in a high power consumption and a complicated driving method.

Japan Applied Physics Society Spring Meeting Preprints, 1p-R-8, p. 122 (1980) reports on a π cell that requires no voltage-based initial orientation for realizing a bend orientation of liquid crystal molecules. This liquid crystal cell realizes a bend orientation by using high-tilt substrates capable of realizing a high pre-tilt angle of liquid crystal molecules by oblique vapor deposition of $CeO_2$, the substrates being disposed in a non-parallel manner where their respective pre-tilt angles are not parallel to each other. However, according to a vapor deposition technique used in the above report, it is difficult to uniformly form a vapor deposited film on a large substrate with a high repeatability, so this method is not applicable to the mass-production of large, high display quality liquid crystal display devices with a high yield.

(Liquid crystal cells including polymer walls)

There has been proposed a method in which polymer walls for connecting substrates are included within a liquid crystal cell, and requires no polarizers or orientation treatment. This method utilizes the birefringence of liquid crystal so as to electrically control between a transparent state and a white state. This method amounts to the following: An ordinary refractive index of liquid crystal molecules and a refractive index of a supporting medium, i.e., a polymer, are made to be equal. As a result, a transparent state is displayed when a voltage is applied, since the liquid crystal molecules are oriented in the same direction. A white state is displayed when no voltage is applied, since the liquid crystal molecules have a random orientation, causing the scattering of light at interfaces of the liquid crystal and the polymer. Examples of such proposed techniques include a method disclosed in Japanese National Patent Publication No. 61-502128. According to this method, liquid crystal is mixed with a photopolymerizable resin or a heat-polymerizable resin and is injected into an interspace between substrates. Thereafter, the resin is cured, thus allowing liquid crystal to deposit between the substrates. As a result, liquid crystal droplets are formed within the resin, whereby polymer walls are obtained.

Japanese Laid-Open Patent Publication No. 5-27242 discloses a method for improving the viewing angle characteristics of a liquid crystal cell in a non-light-scattering mode. A polarizer is used along with the liquid crystal cell. According to this method, a complex material of liquid crystal and a polymer material is produced by a phase separation through which liquid crystal and a polymer resin are separated from a mixture of liquid crystal and a photopolymerizable resin. More specifically, liquid crystal domains are in a random orientation state due to the produced polymer, so that liquid crystal molecules stand in different directions within each liquid crystal domain when a voltage is applied. As a result, the apparent refractive index of the liquid crystal molecules becomes substantially the same irrespective of the direction in which the liquid crystal cell is viewed, i.e., the viewing angle. Thus, the viewing angle characteristics when displaying an intermediate gray tone are greatly improved. Recently, the inventors of the present invention have filed as Japanese Patent Application No. 4-286487 a liquid crystal device having remarkably improved viewing angle characteristics based on the following principle: During photopolymerization, where light is radiated onto a mixture of liquid crystal and a photopolymerizable material, the radiation of light is controlled by using a photomask or the like, so that each liquid crystal domain has an omnidirectional orientation state within a pixel region. Moreover, by controlling the liquid crystal cell by applying or not applying a voltage, the liquid crystal molecules in the liquid crystal domains behave like an umbrella being opened or closed, thereby remarkably improving the viewing angle characteristics.

Moreover, by utilizing the orientation controlling effect of a substrate surface on liquid crystal molecules, the present inventors have filed as Japanese Patent Application No. 5-30996 a method for producing a liquid crystal display device which utilizes the orientation controlling effect of a substrate surface within polymer walls. These inventions relate to liquid crystal devices that operate in a TN (Twisted Nematic) mode, a STN (Super Twisted Nematic) mode, an ECB (Electrically Controlled Birefringence) mode, or an FLC (Ferroelectric Liquid Crystal) mode.

(Stable orientation type cell incorporating a cross-linked polymer)

Japanese Laid-Open Patent Publication Nos. 6-160801 and 6-160814 disclose the fabrication of a liquid crystal display device having a stable orientation by injecting a mixture of a liquid crystal material and a small amount of photopolymerizable resin into a cell whose substrates are provided with orientations appropriate for the STN or TN mode and irradiating the cell with UV (Ultra Violet)-rays.

(Voltage-magnetic field based control of orientation of liquid crystal)

Japan Display 92 S18-4, p. 699 reports on a method for controlling the orientation of liquid crystal within a liquid crystal cell, where a mixture of liquid crystal and a photo-polymerizable is irradiated with UV-rays while applying a very low voltage thereto, so as to impart liquid crystal molecules in liquid crystal droplets with a very small pre-tilt angle. According to this method, the hysteresis characteristics of the display of a liquid crystal cell are improved.

SUMMARY OF THE INVENTION

A liquid crystal display device according to the present invention includes: a pair of electrode substrates including a plurality of pixels arranged in a matrix shape and an electrode formed on a surface of each electrode substrate, at least one of the surfaces being subjected to a rubbing treatment; a wall-like structure formed between the pair of electrode substrates, the wall-like structure including unit walls, and each unit wall corresponding to one of the plurality of pixels; and a liquid crystal layer at least partially partitioned by the wall-like structure and including liquid crystal regions between the pair of electrode substrates, each liquid crystal region corresponding to one of the plurality of pixels, wherein liquid crystal molecules in the liquid crystal regions have a plane-symmetrical orientation with respect to a plane taken in the middle of and in parallel to the electrode substrates, the liquid crystal molecules having a bend orientation.

In one embodiment of the invention, the pair of electrode substrates are in close contact with the wall-like structure.

In another embodiment of the invention, a liquid crystal-line polymer material is included in a material constituting the wall-like structure.

In still another embodiment of the invention, the liquid crystal display device further includes a pair of polarizers, each polarizer being formed on the surface of one of the pair of electrode substrates, and respective polarizing axes of the polarizers being perpendicular to each other, wherein the polarizing axis of one of the pair of polarizers is at 45° with respect to a direction in which the rubbing treatment is conducted for the electrode substrates.

In still another embodiment of the invention, the liquid crystal display device further includes a mono-axial optical compensated film between the liquid crystal layer and one of the pair of polarizers, a main axis of the mono-axial optical compensated film being perpendicular to a longitudinal axis direction of the liquid crystal molecules, and the mono-axial optical compensated film having a retardation equal to $d \cdot \Delta n$, wherein d represents a thickness of the liquid crystal layer and $\Delta n$ represents an effective anisotropy of refractive index of the liquid crystal layer.

In still another embodiment of the invention, the liquid crystal display device further includes a bi-axial optical compensated film between the liquid crystal layer and one of the pair of polarizers, a main axis of the bi-axial optical compensated film being perpendicular to a longitudinal axis direction of the liquid crystal molecules, and the bi-axial optical compensated film having a retardation equal to $d \cdot \Delta n$, wherein d represents a thickness of the liquid crystal layer and $\Delta n$ represents an effective anisotropy of refractive index of the liquid crystal layer.

In still another embodiment of the invention, a material for at least one of the pair of electrode substrates is a polymer material capable of transmitting visible light at least in some wavelengths.

In still another embodiment of the invention, an ordinary refractive index $n_o$ and an extraordinary refractive index $n_e$ of a liquid crystal material constituting the liquid crystal layer, and a refractive index $n_p$ of the material constituting the wall-like structure satisfies the following relationship:

$$|(n_e \text{ or } n_o) - n_p| \leq 0.1.$$

A method for producing a liquid crystal display device according to the present invention, the liquid crystal display device including: a pair of electrode substrates including a plurality of pixels arranged in a matrix shape, at least one of the electrode substrates being transparent; a polymer wall including unit walls, each unit wall corresponding to one of the plurality of pixels; and a liquid crystal layer at least partially partitioned by the polymer wall and including liquid crystal regions between the pair of electrode substrates, each liquid crystal region corresponding to one of the plurality of pixels, wherein liquid crystal molecules in the liquid crystal regions have a plane-symmetrical orientation with respect to a plane taken in the middle of and in parallel to the electrode substrates, the liquid crystal molecules having a bend orientation, includes the steps of: injecting a mixture of a liquid crystal material, a liquid crystalline compound having a polymerizable functional group within molecules thereof, a polymerizable compound, and a photopolymerization initiator between the pair of electrode substrates, at least one of surfaces of the electrode substrates being subjected to a rubbing treatment; and irradiating a liquid crystal cell including the pair of electrode substrates and the mixture with light having a regular spatial distribution of intensities of high and low so as to correspond to the plurality of pixels, while applying at least one of an electric field and a magnetic field, whereby liquid crystal and a polymer material are phase-separated through a photopolymerization reaction so as to form the liquid crystal layer and the polymer wall, respectively.

In one embodiment of the invention, the light having a regular spatial distribution of intensities of high and low is generated by means of a photomask.

In another embodiment of the invention, the mixture present in the liquid crystal cell including the pair of electrode substrates and the mixture is subjected to a photopolymerization by using the light having a regular spatial distribution of intensities of high and low at a temperature equal to or greater than a homogenization temperature of the liquid crystal material, and thereafter is cooled while applying at least one of an electric field and a magnetic field.

In still another embodiment of the invention, the liquid crystal cell is irradiated with light again after the cooling.

Alternatively, a liquid crystal display device according to the present invention includes a display medium including a pair of opposing electrode substrates, a liquid crystal layer interposed between the pair of electrode substrates, and a polymer layer, wherein liquid crystal molecules in the liquid crystal layer have a bend orientation so as to be plane-symmetrical with respect to a plane taken in the middle of and in parallel to the electrode substrates, the polymer layer including a cross-linked polymer in an amount of 0.1% to 5%, by weight, based on the display medium.

In one embodiment of the invention, the cross-linked polymer includes a liquid crystalline compound having a polymerizable functional group within molecules thereof.

In another embodiment of the invention, the liquid crystal display device further includes: a pair of polarizers, each polarizer being formed on a surface of one of the pair of electrode substrates, and respective polarizing axes of the polarizers being perpendicular to each other; and a mono-axial optical compensated film provided between the liquid crystal layer and one of the pair of polarizers, a main axis of the mono-axial optical compensated film being perpendicular to a longitudinal axis direction of the liquid crystal molecules, wherein the polarizing axis of one of the pair of polarizers is at 45° with respect to a direction in which the rubbing treatment is conducted for the electrode substrates.

In still another embodiment of the invention, the liquid crystal display device further includes: a pair of polarizers, each polarizer being formed on a surface of one of the pair of electrode substrates, and respective polarizing axes of the polarizers being perpendicular to each other; and a bi-axial optical compensated film provided between the liquid crystal layer and one of the pair of polarizers, a main axis of the bi-axial optical compensated film being perpendicular to a longitudinal axis direction of the liquid crystal molecules, wherein the polarizing axis of one of the pair of polarizers is at 45° with respect to a direction in which the rubbing treatment is conducted for the electrode substrates.

Alternatively, a method for producing a liquid crystal display device according to the present invention, the liquid crystal display device including a display medium including a pair of opposing electrode substrates, a liquid crystal layer interposed between the pair of electrode substrates, and a polymer layer, wherein liquid crystal molecules in the liquid crystal layer have a bend orientation so as to be plane-symmetrical with respect to a plane taken in the middle of and in parallel to the electrode substrates, includes the steps of: injecting a mixture of 0.1% to 5% by weight of a polymer cross-linkable material including a liquid crystalline polymerizable compound having a functional group in molecules thereof and a liquid crystal material between the pair of electrode substrates, at least one of the electrode substrates being transparent; and phase-separating the liquid crystal layer and the polymer layer by applying at least one of light energy and heat energy to the mixture while stabilizing the bend orientation of the liquid crystal molecules by applying at least one of an electric field and a magnetic field.

In accordance with a liquid crystal display device of the present invention, phase separation (i.e., polymerization of a monomer) of liquid crystal and a polymer material is conducted under an applied voltage, i.e., while keeping a $\pi$ cell oriented. Therefore, the application of a voltage, which is required in the case of a conventional $\pi$ cell in order to attain an initial orientation, is made unnecessary, thereby ensuring a stable orientation. Moreover, since a polymer wall is formed in the liquid crystal display device, the display characteristics are prevented from varying during a pen-inputting operation.

Moreover, according to the present invention, a mixture of a liquid crystal material and a photopolymerizable material (polymer cross-linkable material) added in the range of at least 0.1% to 5% by weight is phase-separated under an applied voltage (i.e., while keeping the $\pi$ cell oriented) so as to give a liquid crystal layer and the polymer film. As a result, the application of a voltage, which is required in the case of a conventional $\pi$ cell in order to attain an initial orientation, is made unnecessary, thereby ensuring a stable bend orientation of liquid crystal molecules. Display characteristics such as the driving voltage of the cell and the contrast of the liquid crystal display device are also improved. If the photopolymerizable material accounts for more than 5% by weight, a large number of polymer walls are formed in pixel regions so as to greatly increase the driving voltage of the cell, and the scattering of light due to differences in the refractive indices of the liquid crystal and the polymer becomes outstanding, thereby lowering the contrast. On the other hand, if the photopolymerizable material accounts for less than 0.1% by weight, the amount of liquid crystal material which is oriented by an orientation force of the polymer film present on the substrate decreases, thereby ruining the practicality of the liquid crystal display device.

Moreover, broad viewing angle characteristics can be provided by using a mono-axial optical compensated film or a bi-axial optical compensated film.

Thus, the invention described herein makes possible the advantages of (1) providing a liquid crystal display device having improved display quality by preventing any change in the cell thickness due to an external force and having remarkably improved viewing angle characteristics while conserving the driving facility of the device; and (2) providing a method for producing a large liquid crystal display device having a high display quality at a high production efficiency.

These and other advantages of the present invention will become apparent to those skilled in the art upon reading and understanding the following detailed description with reference to the accompanying figures.

BRIEF DESCRIPTION OF THE DRAWINGS

FIG. 2 is a diagram for describing an optical configuration according to the present invention.

FIG. 3 is a chart for describing production steps for a liquid crystal display device according to Example 1 of the present invention.

DESCRIPTION OF THE PREFERRED EMBODIMENTS

The inventors of the present invention have invented a liquid crystal display device whose interior is partitioned by a polymer wall so as to provide support against an external force within a cell, liquid crystal molecules thereof having a twisted orientation. The inventors have also discovered that the above-described problems of the prior art can be solved by fixing the liquid crystal molecules in a bend orientation at the time of fabrication of the cell.

Hereinafter, the present invention will be described by way of examples.

(Liquid crystal cell structure)

Figure 1A:
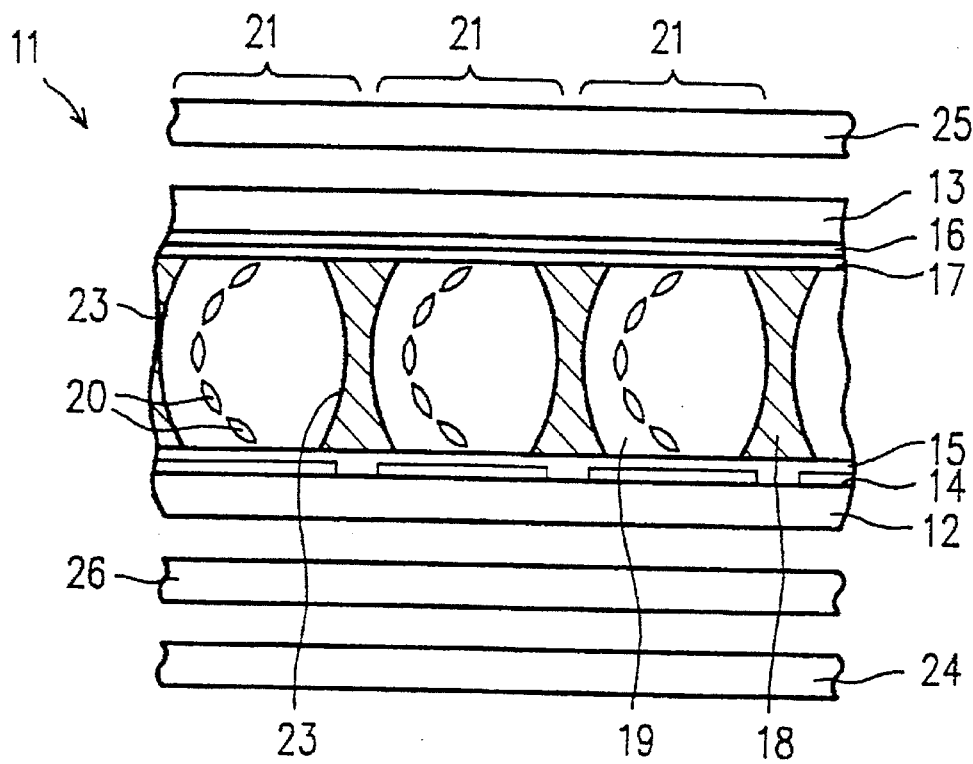
FIG. 1A is a cross-sectional view showing a liquid crystal display device according to the present invention.

(1) FIG. 1A is a cross-sectional view showing a liquid crystal display device according to the present invention. The liquid crystal display device includes a liquid crystal cell 11. As shown in FIG. 1A, the liquid crystal cell 11 includes a pair of substrates 12 and 13, at least one of which is capable of transmitting visible light in some wavelengths. A plurality of transparent electrodes 14 are formed on the substrate 12. An alignment film 15 is formed so as to cover the substrate 12. The transparent electrodes 14 correspond to a plurality of pixels (pixel regions) 21 arranged in a matrix shape on the substrates 12 and 13. On the other substrate 13, a plurality of transparent electrodes 16 are provided so as to oppose the transparent electrodes 14 on the substrate 12, thus constituting the plurality of pixels 21. An alignment film 17 is provided so as to cover the substrate 13. A rubbing treatment (to be described later) is conducted for the alignment films 15 and 17. A polymer wall 18 having a wall-like structure is formed between the substrates 12 and 13. The polymer wall 18 creates a plurality of liquid crystal regions 19 corresponding to the pixels 21. The polymer wall 18 includes unit walls which partly or entirely partition liquid crystal so as to correspond to the respective pixels 21. On the outer side of the substrates 12 and 13, polarizers 24 and 25 are disposed, respectively.

The liquid crystal cell 11 of the present invention has micro-cell structures corresponding to the respective pixels 21. In each micro-cell structure, there is one liquid crystal region 19, which is substantially surrounded by the polymer wall 18, while maintaining a bend orientation between the substrates 12 and 13, so as to be interposed by one of the transparent electrodes 14 and one of the transparent electrodes 16. The polymer wall 18 according to the present invention is different from a polymer wall disclosed in Japanese Laid-Open Patent Publication No. 4-323616 and the like, which is obtained by previously producing a polymer wall on one of a pair of substrates, forming a cell by opposing the two substrates so as to be fixed by means of a sealant, and injecting a liquid crystal material between the substrates. The polymer wall 18 is characterized by being in close contact with or adhered to the substrates 12 and 13. By thus adhering the polymer wall 18 to the substrates 12 and 13, the liquid crystal cell 11 of the present invention can further prevent the fluctuation in the cell thickness due to an external force being applied. As a result, any change in color of the liquid crystal cell is prevented that would result when a pen-inputting operation is conducted by means of a pen-shaped input means for pressing a desired portion of a transparent position detection film provided on a conventional liquid crystal cell. Moreover, the liquid crystal cell 11 has an improved shock resistance when being dropped, etc.

In cases where a large-display liquid crystal display device including a liquid crystal cell composed of substrates and a liquid crystal layer injected there-between is placed in an upright position, the cell thickness tends to increase toward the bottom due to the mass of the liquid crystal material itself, thereby leading to unevenness in the display along the vertical direction. On the other hand, according to the present invention, the liquid crystal cell 11 including a polymer wall 18 adhered to the substrates 12 and 13 has an extremely small fluctuation in the thickness thereof. Moreover, in cases where a polymer liquid crystal material having a similar effect to the orientation force of the substrates 12 and 13 on the liquid crystal molecules is fixed in the polymer wall 18, an orientation force is provided along the horizontal direction with respect to the substrates 12 and 13 from the surfaces of the substrates 12 and 13, and an orientation force is provided along the vertical direction with respect to the substrates 12 and 13 from the vertical faces 23 of the polymer wall 18. Therefore, the bend orientation of liquid crystal molecules having a high tilt angle and therefore a low stability is highly stabilized.

By purposely fabricating a large portion of the polymer wall 18 so as to be located outside the pixels, the decrease in contrast due to the display of a black image under a crossed-Nicol state can be prevented by the polymer material that is present in the pixels, as compared with a case where the polymer wall 18 is provided in an arbitrary position. Moreover, a thin polymer film may be formed on an interface between each liquid crystal region 19 and the substrates 12 and 13 during the formation of the polymer wall 18. The orientation force of the substrates 12 and 13 is transmitted to the liquid crystal molecules 20 through the polymer, so that the liquid crystal molecules 20 can have a uniform orientation. Also, since the polymer wall 18 and the above-mentioned polymer thin film wrap the liquid crystal regions 19 in a three-dimensional manner, the liquid crystal cell 11 of the present invention has a further improved strength against such an external force as that applied during a pen-inputting operation.

Figure 1B:
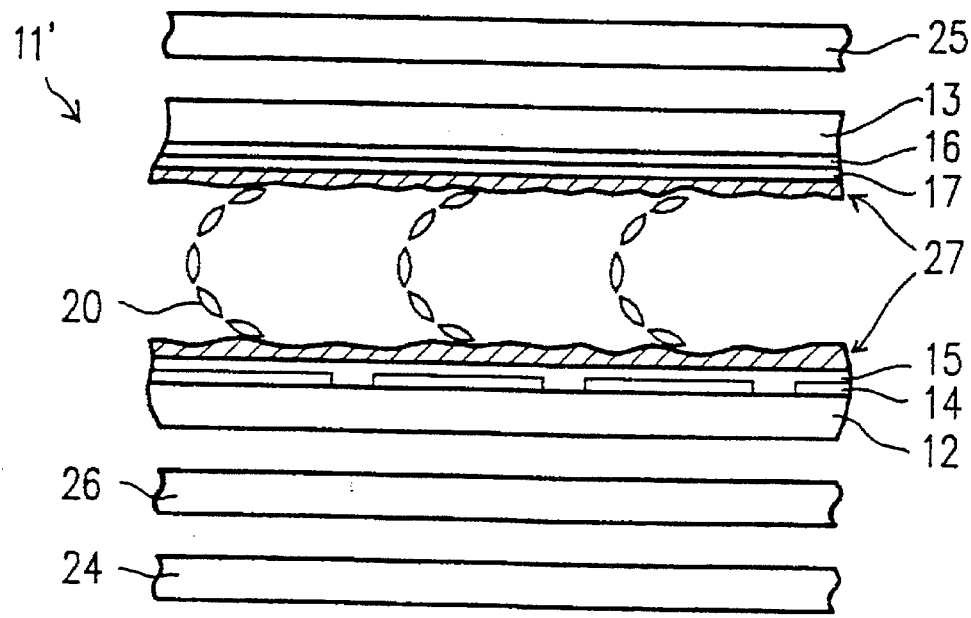
FIG. 1B is a cross-sectional view showing another liquid crystal display device according to the present invention.

(2) FIG. 1B shows a cross section of a liquid crystal display device having another structure according to the present invention. In contrast with the structure described in (1) above, a liquid crystal cell 11' of this structure includes no polymer wall, but includes polymer films 27 covering alignment films 15 and 17. Since all the other aspects of this structure are the same as the above-described structure, like constituent elements are indicated by like numerals in FIG. 1B, and descriptions thereof are omitted. According to this structure as well, the orientation force of substrates 12 and 13 is transmitted to liquid crystal molecules 20 through the polymer, so that the liquid crystal molecules 20 can have a uniform orientation. As a result, a stable bend orientation can be obtained.

(Production method)

According to a method for producing the liquid crystal display device of the present invention, when fabricating the liquid crystal cell 11 or 11' shown in FIG. 1A or 1B, the orientation force of the substrates 12 and 13 on the liquid crystal molecules (which provides the liquid crystal molecules with a reverse pre-tilt angle) is utilized, and the polymer wall 18 is formed substantially outside the pixels 21. Therefore, a mixture of a liquid crystal material and a photopolymerizable material (including a liquid crystalline polymerizable material and a photopolymerization initiator) is injected between the substrates 12 and 13, for which an orientation treatment has been conducted; thereafter, the liquid crystal cell 11 or 11' is partially irradiated with UV-rays, while applying at least one of an electric field and a magnetic field to the liquid crystal cell 11 or 11', in such a manner that substantially no UV-rays are radiated on the pixels 21.

According to the method for producing the liquid crystal display device, including a polymer wall, of the present invention, the polymer material is formed through polymerization in regions of the mixture which are irradiated with UV-rays (hereinafter referred to as "strongly irradiated regions"), so as to thrust the liquid crystal to regions which are not irradiated with UV-rays (hereinafter referred to as "weakly irradiated regions"). As a result, the polymer wall 18 is formed in the strongly irradiated regions, whereas the liquid crystal regions 19 are formed in the weakly irradiated portions. In order to utilize the orientation force of the substrates 12 and 13, a photopolymerizable material having liquid crystallinity (liquid crystalline polymerizable material) may be used either as a portion of or as the entire photopolymerizable material, whereby photopolymerization can be conducted without ruining the liquid crystallinity of the mixture of the liquid crystal and the photopolymerizable material. Since at least one of an electric field and a magnetic field, provided from outside, is applied during the phase separation process of the liquid crystal and the polymer material, the liquid crystal regions 19 that have phase-separated grow in such a manner that the liquid crystal molecules 20 in the liquid crystal regions 19 are aligned in a bend orientation, owing to the effect of the orientation force of the substrates 12 and 13 and the external field(s).

Finally, the surrounding polymer material is cured while the liquid crystal molecules 20 in the liquid crystal regions 19 maintain the bend orientation state, so that a polymer film adhered to the substrate 12 and 13 becomes an alignment film for providing the liquid crystal molecules 20 with a high pre-tilt angle. As a result, the orientation state of the liquid crystal is stabilized.

Moreover, according to the method for producing the liquid crystal display device of the present invention, the above-mentioned mixture is injected into a cell including the pair of substrates 12 and 13 adhered by means of a sealant at a temperature equal to or higher than the homogenization temperature of the mixture, and UV-rays having a regular distribution of intensities of high and low (corresponding to the strongly irradiated regions and the weakly irradiated regions, respectively) are radiated so as to effect a photopolymerization having a predetermined regularity. In addition, in order to impart the mixture with liquid crystallinity, the temperature of the cell may be gradually lowered to a temperature corresponding to a nematic phase or a smectic phase so as to effect a further photopolymerization, whereby the liquid crystal molecules 20 can have a uniform orientation state over the surfaces of the substrates 12 and 13. If the liquid crystal to be used is closer to that of a smectic phase, which has comparatively excellent crystallinity, the photopolymerizable material mixed in the liquid crystal can be more effectively drained out of the liquid crystal, so that the decrease in contrast due to the formation of any polymer material within the pixels 21 can be prevented. As a result, the liquid crystal cell 11 can have an even better display quality.

(Method to achieve UV-rays having a regular distribution of intensities of high and low)

According to the present invention, it is important how to achieve UV-rays having a regular distribution of intensities of high and low. It is preferable to achieve such a regular distribution of UV-rays by using a photomask, a microlens, an interference plate or the like (hereinafter referred to as "light intensity distribution regulating means"). The position of the photomask or the like may be either inside or outside the cell as long as a regular distribution of UV-rays can be obtained. The photomask should preferably be as close to the mixture of the liquid crystal material and the photopolymerizable material as possible. If the distance between the substrate and the photomask is made large, an optical image made on the mixture and created by an image (or pattern) carried on the photomask becomes blurred, thereby reducing the effect of the present invention. It is most preferable if a substantial photomask for cutting off UV-rays is present on the inside of the cell because such a photomask will be in contact with the mixture of the liquid crystal material and the photopolymerizable material. Specifically, in cases where the liquid crystal cell according to the present invention is applied to a reflection type liquid crystal display device, it is preferable to so prescribe that only the portions of a reflection plate that correspond to the pixels function to reflect light, while the other portions transmit light. Alternatively, it is preferable to regularly form a film for transmitting visible light and interrupting UV-rays on one of the substrates in regions other than the strongly irradiated regions so as to correspond to the pixels 21. This method can be implemented by using a color filter or an organic polymer film provided in the cell.

Herein, UV-rays to be used should preferably be parallel rays, so as to achieve an accurate optical image on the above-mentioned mixture. If the UV-rays are less parallel than they should be, they unfavorably go into the weakly irradiated regions, so that the polymer material is cured in the regions corresponding to the pixels 21. As a result, the contrast of the liquid crystal display device decreases for the above-mentioned reason.

According to a study by the present inventors, by using a light intensity distribution regulating means having masking regions that provide weakly irradiated regions which are 30% or smaller in size than that of the pixels 21, the resultant liquid crystal droplets 19 (liquid crystal regions) also become 30% or smaller in size of that of the pixels 21, so that a number of interfaces are created between the liquid crystal and the polymer within the pixels 21. As a result, the contrast decreases due to scattering of light at such interfaces. However, the light intensity distribution regulating means should preferably have masking portions which are large enough, with respect to the pixels 21, so as to create an adequate number of interfaces between the liquid crystal and the polymer in the pixels 21. In other words, the number of interfaces between the liquid crystal and the polymer should not be extremely small. A photomask or the like which ensures that only portions other than the pixels 21 are irradiated with UV-rays is preferable.

Each masking portion can have any shape as long as the UV-ray intensity is locally lowered in 30% or more of the entire area of each pixel 21. For example, the configuration of each masking portion can be (although not limited to those which listed herein) a circle, a square, a trapezoid, a rectangle, a hexagon, a diamond shape, a letter, or shapes surrounded by a curved and/or straight line(s). A configuration obtained by combining some of the above shapes, etc. can also be used. A photomask or the like which ensures that the portions to become the pixels 21 are weakly irradiated is preferable because it can lower the intensity of light scattering within the pixels 21 and improve the display contrast of the liquid crystal display device. When the present invention is practiced, one or more of these shapes are to be selected. In order to improve uniformity of the liquid crystal droplets, it is preferable to limit the configuration to one shape.

One feature of the present invention is the regular arrangement of the liquid crystal regions 19, along the horizontal direction, i.e., so as to correspond to the pixels 21. Therefore, the arrangement of the masking portions is important. It is preferable that the masking portions are arranged at the same pitch as the pitch for the pixels 21. It is preferable to provide one masking portion within one pixel 21.

Moreover, one masking portion can be provided for more than one pixel 21. Each masking portion can be provided for a row of pixels 21 arranged in a matrix, or for a group consisting of more than one pixel 21. Furthermore, the masking portions do not need to be independent from one another, but can be connected to one another at an end portion, as long as the portions interrupting the UV-rays most effectively have one or more of the above-mentioned configurations and/or arrangements. In cases where the pixels 21 are relatively large, the polymer wall 18 may be purposely fabricated within the pixels 21. In such cases, the contrast may decrease, but an enhanced support against an external force can be obtained.

(Method for applying an electric field and/or a magnetic field)

The irradiation of the mixture of liquid crystal and a photopolymerizable material with UV-rays while applying at least one of an electric field and a magnetic field is critical to the formation of a bend orientation state used in the present invention. The liquid crystal layer, which previously was in a spray orientation, takes a bend orientation state because of the electric field applied. A UV-ray polymerizable material is cured with UV-rays in order to fix the liquid crystal in this state. The intensity of the electric field and/or the magnetic field to be applied may vary depending on the cell thickness, the anisotropy of dielectric constant and the elastic constant of the liquid crystal material, and the like. The present invention does not provide particular limitations as to the intensity of the electric field and/or the magnetic field as long as the intensity is equal to or larger than an intensity at which the bend orientation becomes more stable than the spray orientation.

Moreover, a voltage which is just high enough so as not to allow the liquid crystal to shift from the bend orientation state to the spray orientation state after applying a high voltage may be used.

(Coarseness of display)

As described above, a conventional polymer dispersed type liquid crystal display device is not free from the light-scattering phenomenon at the interfaces between the polymer material and the liquid crystal material, owing to the difference in refractive index between the polymer material and the liquid crystal material. Non-light-scattering mode liquid crystal display devices with large liquid crystal regions 19 surrounded by polymer walls, such that the orientation state of liquid crystal molecules is read out through polarizers, also has a similar light-scattering phenomenon. Such a light-scattering phenomenon causes a coarseness in the display, thereby lowering the display quality of the liquid crystal display device. However, according to the present invention, even the polymer material is partly in a similar orientation state to that of liquid crystal immediately before and after the curing of the photopolymerizable material, so that the liquid crystal material and the liquid crystalline photopolymerizable material have substantially the same refractive index. As a result, the coarseness problem of display is remarkably reduced. Furthermore, since only a small amount of photopolymerizable material is added to the liquid crystal material, that is, the rate of the polymer present in the liquid crystal is small, the above-mentioned light-scattering phenomenon is subdued.

(Liquid crystalline polymerizable material)

According to the method for producing the liquid crystal display device of the present invention, a homogeneous mixture of a liquid crystal material and a polymerizable material (including a liquid crystalline polymerizable material) is phase-separated by curing the polymerizable material while it is aligned in a liquid crystal state between the pair of substrates 12 and 13, so as to give the liquid crystal and polymer material. Thus, a structure can be obtained in which the liquid crystalline polymerizable material is stabilized on the polymer wall 18 and the polymer film. As a result, the liquid crystal molecules 20 receive an orientation force from the vertical faces 23 (shown in FIG. 1A) of the polymer wall 18 as well as from the surfaces of the substrates 12 and 13, so that the orientation of the liquid crystal is stabilized, and the homogeneity of orientation in the vicinity of the polymer wall 18 is secured.

In contrast, the conventional method of stabilizing one substrate after the fabrication of the polymer wall on another substrate allows a random orientation to occur in the vicinity of the polymer wall, thereby degrading the display uniformity. The present invention solves this problem of non-uniform display.

In order to stabilize the bend orientation according to the present invention, it is preferable to conduct the UV-ray irradiation while maintaining the mixture of the liquid crystal and the photopolymerizable material in a liquid crystal state and under an applied voltage. Thus, the effects of the present invention will be secured. In this regard, it is preferable to include a liquid crystalline polymerizable material having a functional group which is likely to exhibit liquid crystallinity in the photopolymerizable material.

Examples of compounds having a liquid crystalline functional group within the molecules thereof to be used in the present invention include those represented by the following Formula I or II:

$$A—B—LC_1: \text{Formula I}$$

A—B—LC$_2$—B—A : Formula II where A represents polymerizable functional groups and more specifically represents functional groups having a heterocyclic structure with a strain such as an epoxy group or unsaturated bonds, e.g., CH$_2$=CH—, CH$_2$=CH—COO—, CH$_2$=CH—COO—,

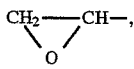

—N=C=O;
and B represents connecting groups connecting a polymerizable functional group and a liquid crystalline compound and more specifically represent an alkyl chain (—(CH$_2$)$_n$—), an ester bond (—COO—), an ether bond (—O—), a polyethylene glycol chain (—CH$_2$CH$_2$O—), and combinations thereof. Connecting groups having 6 or more bonds from a polymerizable functional group to a rigid portion of the liquid crystal molecule are preferred, since an easy movement on the polymer wall 18 in response to an electric field is preferred after the fabrication of the polymer wall 18.

LC$_1$ in Formula I represents a liquid crystalline compound. Examples of the compound include those represented by the following Formula III or a cholesterol ring, or its derivative.

D—E—G : Formula III where G represents a polar group that allows liquid crystal to exhibit anisotropy of dielectric constant, and more specifically represents a benzene ring, a cyclohexane ring, a paradiphenyl ring, a phenylcyclohexane ring, a terphenyl ring, and a diphenylcyclohexane ring, and the like having a functional group such as —CN, —OCH$_3$, —F, —Cl, —OCF$_3$, or —OCCl$_3$; E represents a functional group connecting the functional group D with the polar group G, such as a single bond, —CH$_2$—, —CH$_2$CH$_2$—, —O—, —C≡C—, and —CH=CH—; and D represents a functional group capable of bonding to B in Formula I or II, which affects the degree of anisotropy of dielectric constant and anisotropy of refractive index, and more specifically represents a paraphenyl ring, a 1,10-diphenyl ring, a 1,4-cyclohexane ring, a 1,10-phenylcyclohexane ring, and the like. Examples of the compounds LC$_2$ in Formula II contain a rigid molecule such as a paraphenyl ring, a 1,10-diphenyl ring, a 1,4-cyclohexane ring, and a 1,10-phenylcyclohexane ring. One of these molecules may be used alone, or a molecule composed of a plurality of these molecules connected by a connecting group such as a single bond, —CH$_2$CH$_2$—, —CH=CH—, —C≡C—, —COO—, —N=CH—, —O—, —N=N—, and —COS— may be used.

In the case where the liquid crystal material used in the liquid crystal display device of the present invention has a positive anisotropy of dielectric constant, the above-mentioned polar group G in Formula III is preferably so positioned that the anisotropy of dielectric constant Δε becomes positive. More specifically, a benzene ring, which is included in the examples of the polar group G, that has a functional group at the 2-position, the 3-position, or the 2,3-position is preferred. In the case where the liquid crystal material used in the liquid crystal display device of the present invention has a negative anisotropy of dielectric constant, the above-mentioned polar group G in Formula III is preferably so positioned that the anisotropy of dielectric constant Δε becomes negative. More specifically, a benzene ring, which is included in the examples of the polar group G, that has a functional group at the 4-position, the 3,4,5-position, or the 3,4-position is preferred.

In cases where a plurality of the above-mentioned substituted bodies of polar groups are present in the same molecule, it is not required that the substituted bodies are identical with one another. In both of the above-mentioned cases, it is not required to use only one kind of liquid crystalline compound, but a plurality of liquid crystalline compounds may be used as long as they include at least one kind of the above-mentioned compounds. It is not required that the above-mentioned compound exhibits liquid crystallinity by itself, but it is required not to greatly lower the liquid crystallinity of the host liquid crystal material. The definition of the liquid crystalline polymerizable material according to the present invention encompasses those of the above-structured compounds which do not exhibit liquid crystallinity by themselves.

(Photopolymerizable material)

As the photopolymerizable material, acrylic acid and acrylic acid ester having a long-chain alkyl group with three or more carbon atoms or a benzene ring may be used, for example. More specifically, examples of the photopolymerizable material include isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl acrylate, and isobornyl methacrylate. For enhancing the physical strength of the polymer, multifunctional compounds with two or more functional groups, such as R-684 (produced by Nippon Kayaku Co., Ltd.), bisphenol A dimethacrylate, bisphenol A diacrylate, 1,4-butanediol dimethacrylate, 1,6-hexanediol dimethacrylate, trimethylol propane trimethacrylate, trimethylol propane triacrylate, tetramethylolmethane tetraacrylate, and neopentyl diacrylate may be used. Furthermore, in order to reduce the anchoring strength at the polymer-liquid crystal interfaces and reduce the driving voltage, halogenated, and in particular chlorinated or fluorinated compounds may be used. Examples of such compounds include 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate.

(Liquid crystal material)

The liquid crystal material to be used for the present invention is an organic mixture exhibiting a liquid crystalline state in the vicinity of room temperature. Nematic liquid crystal (for dual frequency driving, including liquid crystal whose Δε<0), cholesteric liquid crystal, or nematic liquid crystal with a chiral agent added is preferred because of their characteristics. In this case, the chiral pitch is preferably 10 μm or more. If the chiral pitch is 10 μm or less, the orientation force from the substrates 12 and 13 is not sufficient, so that the orientation of the liquid crystal molecules 20 becomes helical, for which optical compensation is difficult to achieve by using a mono-axial optical compensated film 26 (shown in FIG. 1A). More preferably, the liquid crystal material should have excellent resistance against chemical reactions, since a photopolymerization reaction is effected during the production of the liquid crystal display device 11 of the present invention. Examples of such liquid crystal materials include those having a functional group such as fluorine atoms in the compounds. More specifically, ZLI-4801-000, ZLI-4801-001, ZLI-4792, and ZLI-4427 (produced by Merck & Co., Inc.) can be used.

As for the selection of such a liquid crystal material and a liquid crystalline compound having a polymerizable functional group in the molecules thereof, it is preferable that their respective portions exhibiting liquid crystallinity are similar for the sake of compatibility therebetween. In particular, when a fluorine type or chlorine type liquid crystal material is selected, which creates a specific chemical environment, the liquid crystalline compound having a polymerizable functional group should also be a fluorine type or chlorine type.

As for the various refractive indices of the liquid crystal material, an ordinary refractive index $n_o$ and an extraordinary refractive index $n_e$ of the liquid crystal material constituting the liquid crystal layer, and the refractive index $n_p$ of the polymer material constituting the polymer wall 18 preferably satisfy the following Expression 1:

$$|(n_e \text{ or } n_o) - n_p| \leq 0.1: \text{Ex. 1}$$

If the above-mentioned refractive indices do not satisfy Expression 1, the refractive indices of the liquid crystal and the polymer material are mismatched, so that display coarseness increases and the contrast decreases. More preferably, $n_p$ takes a value between $n_e$ and $n_o$. If the refractive index $n_p$ is within this range, only a small difference is present between the refractive index of the polymer wall 18 and that of the liquid crystal material even when the liquid crystal molecules 20 are driven by a voltage, so that light scattering caused at the interfaces between the liquid crystal material and the polymer material can be greatly reduced.

(Mixing ratio of materials)

The amount of the liquid crystalline polymerizable material to be added should be such that the mixture of the liquid crystalline polymerizable material, the liquid crystal material, the photopolymerization initiator, and the photopolymerizable material can take a liquid crystal state. The proper amount of the liquid crystalline polymerizable material in this regard varies depending on the material. Although the present invention provides no particular limitation, it is preferable that the liquid crystalline polymerizable material accounts for 30% to 90% by weight in the photopolymerizable material. If the liquid crystalline polymerizable material accounts for less than 30% by weight, the temperature range in which the mixture can take a liquid crystal state becomes small, so that it becomes impossible to align the liquid crystal molecules 20 between the substrates 12 and 13 of the liquid crystal cell 11, which is a $\pi$ cell. If the liquid crystalline polymerizable material accounts for more than 90% by weight, the elastic constant of the liquid crystalline polymerizable material after the curing becomes low, so that the liquid crystal cell 11 cannot have sufficient support against external forces.

The liquid crystal material and the polymerizable material should preferably constitute a ratio in the range of, by weight, 50:50 to 97:3, and more preferably, 70:30 to 95:5, when mixed together. If the liquid crystal material accounts for less than 50% by weight of the above-mentioned mixture, the polymer wall 18 matrix exercises excessive influence, so as to considerably increase the driving voltage of the liquid crystal device. Moreover, fewer liquid crystal regions 19 are aligned by the orientation force of the substrates 12 and 13, thereby ruining practicality of the liquid crystal display device. On the other hand, if the liquid crystal accounts for more than 97%, the polymer wall 18 does not sufficiently form, and the physical strength thereof decreases, thereby resulting in unstable performance of the liquid crystal display device.

Moreover, in cases where no polymer wall is grown, as shown in FIG. 1B, the present inventors have found that it is preferable that, regarding the mixing ratio between the liquid crystal material and the polymerizable material (including the liquid crystalline polymerizable material), the photopolymerizable material accounts for 0.1% to 5% by weight of the total amount of the liquid crystal material and the photopolymerizable material. The reason is that, since no photomask is required in this case, a photopolymerizable material accounting for more than 5% by weight will allow a large number of polymer walls within the pixel regions, so that the driving voltage of the cell considerably increases and that the light-scattering phenomenon due to the difference in the refractive indices of the liquid crystal and the polymer becomes conspicuous, thereby lowering the contrast. On the other hand, if the photopolymerizable material accounts for less than 0.1% by weight, the number of the liquid crystal regions that are aligned along the orientation force of the polymer on the substrates 12 and 13 decreases, thus reducing the practicality of the device.

(Retardation: $d \cdot \Delta n$)

In accordance with the liquid crystal cell 11 or 11' of the present invention, the liquid crystal regions 19 are in an orientation state similar to that of an ordinary $\pi$ cell, so that the optimum retardation of the liquid crystal cell 11 or 11' and retardation of a phase difference plate (optical compensated film) incorporated in the device are similar to the values taken in the case of an ordinary $\pi$ cell. Regarding a product obtained by multiplying the cell thickness $d_1$ by the effective refractive index anisotropy $\Delta n_1$ of the liquid crystal, the following has been found: the brightest display can be obtained when $d_1 \cdot \Delta n_1 / \lambda_1$, taken at a wavelength corresponding to green light ($\lambda = 550$ nm), is a value obtained by multiplying ½ by an integer. Accordingly, the value $d_1 \cdot \Delta n_1$ should preferably satisfy the above condition. In particular, the value $d_1 \cdot \Delta n_1$ preferably is 250 to 350 nm for the sake of improvement in the contrast and elimination of unfavorable coloration. In particular, the liquid crystal display device of the present invention utilizes the light transmission effect due to retardation, so that it is most preferable that the retardation $d_1 \cdot \Delta n_1$ is in the vicinity of 275 nm, at which green light ($\lambda = 550$ nm), which is most easily perceived by human eyesight, is transmitted most efficiently. However, the use of the liquid crystal cell 11 or 11' alone results in viewing angle characteristics that are only symmetrical along the left-right direction, with respect to one direction of the liquid crystal molecule axis, instead of omnidirectional viewing angle characteristics.

In order to solve this problem, the optical compensated film 26 composed of a mono-axial optical compensated film or a bi-axial optical compensated film is provided between the polarizer 24 and the substrate 12 so as to have an optical configuration shown in FIG. 2. Thus, omnidirectional viewing angle characteristics can be obtained. As shown in FIG. 2, respective polarization directions 51 and 52 of a pair of substrates 24 and 25 each constitute 45° with a molecular axis of each liquid crystal molecule 20, i.e., a longitudinal direction 50, and the polarization directions 51 and 52 are perpendicular to each other. In addition, a main axis direction 53 of the optical compensated film 26 is prescribed to be perpendicular to the molecular axis direction 50. In order to achieve this optical configuration, a product obtained by multiplying a refractive index anisotropy $\Delta n_2$ of the substrate having the function of optical phase compensation by a thickness $d_2$ of the same substrate is very critical. It is preferable that a difference between the two products $(d_1 \cdot \Delta n_1 - d_2 \cdot \Delta n_2)$ is substantially zero. Moreover, the optical axis of the substrate having the function of optical phase compensation and the orientation direction of the liquid crystal molecules 20 on the substrates 12 and 13 are important. The longitudinal axes of the liquid crystal molecules 20 is preferably substantially perpendicular to the optical axis of the mono-axial optical compensated film 26, as shown in FIG. 2.

(Photopolymerization initiator)

As the photopolymerization initiator (or a catalyst), Irgacure 184, Irgacure 651, Irgacure 907, Darocure 1173, Darocure 1116, and Darocure 2959 can be used. The additional amount of the photopolymerization initiator is preferably in the range of 0.3 to 5% by weight based on the total weight of the liquid crystal and the polymerizable material. If the additional amount of the photopolymerization initiator is less than 0.3% by weight, sufficient photopolymerization does not take place. On the other hand, if the additional amount of the photopolymerization initiator is more than 5% by weight, the phase-separation rate of the liquid crystal and the polymer material becomes so large that the formation of the liquid crystal regions 19 so as to correspond to the pixels 21, for example, becomes difficult to control. As a result, the liquid crystal droplets become small, thereby increasing the driving voltage.

In the case where a plastic substrate is used for the substrates 12 and 13 of the liquid crystal cell 11 or 11', UV-rays are absorbed in the substrates 12 and 13, thereby hindering the polymerization of the mixture. Therefore, a photopolymerization initiator having an absorption band in visible light regions and polymerizable in visible light regions is preferably used. More specifically, Lucirin TPO (produced by BASF Ltd.), KYACURE DETX-S (produced by Nippon Kayaku Co., Ltd.), and CGI 369 (produced by CIBA-GEIGY Corporation) can be used.

(Driving method)

The liquid crystal cell 11 thus produced can be driven by a simple matrix drive method, and an active matrix drive method using a-Si TFTs (i.e., thin film transistors formed of amorphous silicon), p-Si TFTs (i.e., thin film transistors formed of polysilicon) or MIMs (i.e., switching elements of a metal-insulator-metal structure) for the respective pixels 21. However, the present invention does not provide particular limitations as to the driving method.

(Material for the substrates)

As a material for the substrates 12 and 13, a transparent solid material such as glass and a polymer film can be used. When the liquid crystal display device is used as a reflection type, a non-transparent solid material such as a substrate provided with a thin metal film, an Si substrate, and the like can be used.

As a material for such a plastic substrate, materials having an absorption region outside the visible light regions are preferred. Examples of such materials include PET, an acrylic polymer, polystyrene, and polycarbonate.

Two substrates made of different materials can be attached to each other to form a cell. Furthermore, substrates having different thicknesses can be attached to each other so as to form a cell, regardless of whether the respective materials are the same or different.

Hereinafter, the present invention will be described by way of illustrative examples with reference to the drawings. It is noted that the present invention is not limited to the following examples.

EXAMPLE 1

A liquid crystal display device of the present example incorporates the same liquid crystal cell 11 shown in FIG. 1A. A method for producing the liquid crystal display device of the present example will be described with reference to FIG. 3.

Figure 4:
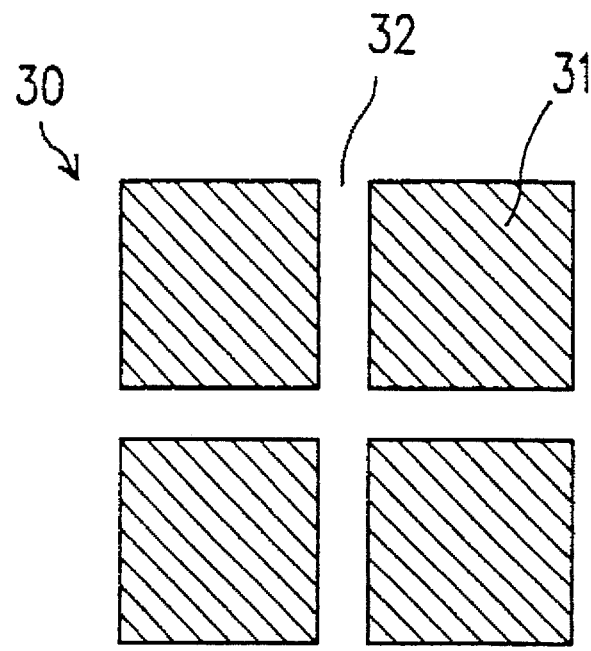
FIG. 4 is a plan view showing a portion of a photomask used in Example 1 of the present invention.

In step a1, transparent electrodes 14 and 16 (thickness: 50 nm) of ITO (Indium Tin oxide) were respectively formed on glass substrates 12 and 13 (thickness: 1.1 mm). Polyimide was spin-coated onto the resulting substrates 12 and 13 so as to form alignment films 15 and 17. The alignment films 15 and 17 were subjected to a rubbing treatment in one direction with a nylon cloth. In step a2, the substrates 12 and 13 were attached to each other in such a manner that the respective alignment directions were identical. Spacers having a particle size of 7 µm were injected between the substrates 12 and 13. Then, the substrates 12 and 13 were sealed with a sealant to form an empty cell. In step a3, a photomask 30 was placed on the empty cell in such a manner that the pixels 21 were masked. As shown in FIG. 4, the photomask 30 had square masking regions 31 arranged in a matrix and light transmitting regions 32 formed between the respective masking regions 31.

In step a4, 0.10 g of R-684 (manufactured by Nippon Kayaku Co., Ltd.), 0.05 g of styrene, 0.75 g of Compound A represented by the following Formula IV, 0.10 g of isobornyl acrylate, 4 g of Liquid crystal material E7 (manufactured by Merck & Co., Inc.; Δn: 0.225; homogenization temperature: 60.5° C.), and 0.025 g of photopolymerization initiator (Irgacure 651) were homogeneously mixed at a homogenization temperature of 40° C. to make a mixture to be injected into the empty cell.

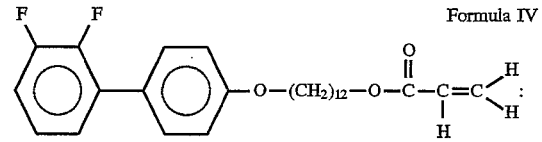

Formula IV

In step a5, the mixture was capillary-injected into the empty cell. Thereafter, in step a6, a UV-ray irradiation was conducted as follows:

The cell was irradiated with collimated UV-rays at 10 mW/cm² under a high-pressure mercury lamp while a voltage of ±4 volts were applied between the transparent electrodes 14 and 16. Then, the cell was heated to a temperature of 100° C., and under this condition, the cell was irradiated with UV-rays through the photomask 30 for 10 minutes. At this time, the UV-rays were radiated onto the cell in a pattern of regularly repeating weakly irradiated regions as described above.

Next, under the applied voltage, the cell was gradually cooled at 10° C./hr to 25° C. At this temperature, the liquid crystal transited into a nematic state. The UV-rays were continuously radiated onto the cell for another 3 minutes so as to polymerize the polymerizable material. During this cooling step, the liquid crystal molecules 20 were more satisfactorily aligned, owing to the orientation force of the substrates 12 and 13, than in the case where the cell was not cooled. As a result, the display quality can be further enhanced. Thereafter, in step a7, the photomask 30 was peeled off from the cell.

Figure 5:
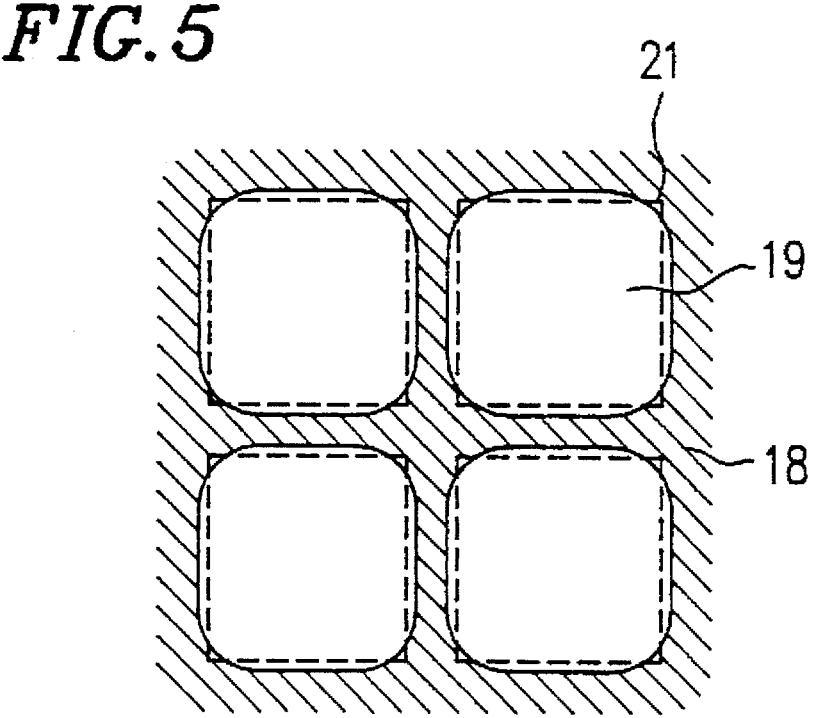
FIG. 5 is a plan view showing liquid crystal regions and a polymer wall produced according to Example 1 of the present invention.

Using a polarization microscope to observe the liquid crystal cell thus produced, it was revealed that liquid crystal regions 19 were formed in accordance with a pattern of the masking regions 31 and the light transmitting regions 32. As shown in FIG. 5, pixel regions 21 were formed in a matrix having the same pattern as that of the masking regions 31, and a plurality of liquid crystal regions 19 were respectively formed with substantially the same size as that of the pixel regions 21. A polymer wall 18 was formed so as to be present between the respective liquid crystal regions 19. In this liquid crystal cell, the liquid crystal regions 19 maintained the same structure as that of a conventional π cell in a bend orientation under an applied voltage as shown in Comparative Example 1. Furthermore, the liquid crystalline polymerizable material was polymerized, so that the polymer wall 18 contained a liquid crystalline polymer (liquid crystalline compound having a polymerizable functional group within molecules thereof).

In step a8, polarizers 24 and 25 were attached to the cell in such a manner that the respective polarization directions of the polarizers 24 and 25 constituted 45° with respect to the respective rubbing directions of the substrates 12 and 13 and that the respective polarization directions of the polarizers 24 and 25 were at 90° with respect to each other. Thus, a π cell type liquid crystal display device was produced.

COMPARATIVE EXAMPLE 1

Only the same liquid crystal material as that used in Example 1 was injected into the same empty cell as that of Example 1 to form a liquid crystal cell. Polarizers were attached to the liquid crystal cell thus fabricated in the same way as in Example 1 to form a conventional π cell.

Figure 6:
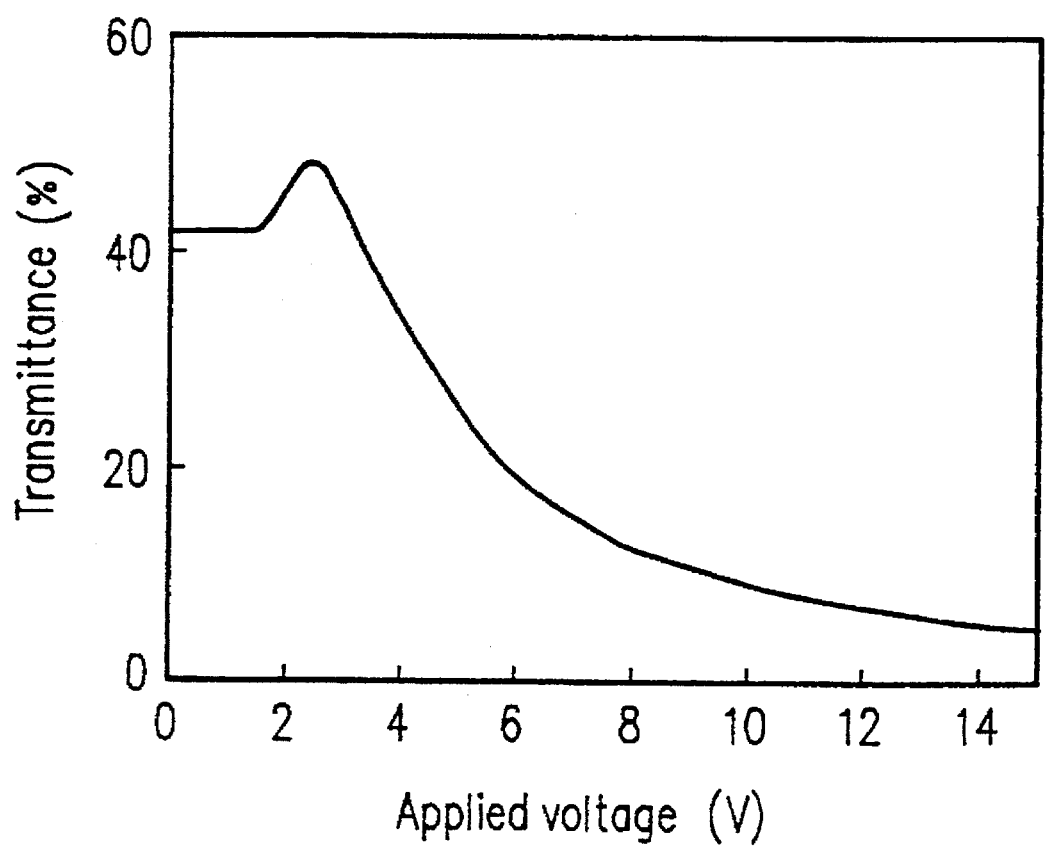
FIG. 6 is a graph showing electrooptical characteristics of a liquid crystal display device produced according to Example 1 of the present invention.

FIG. 6 is a graph showing the relationship between an applied voltage and light transmittance of the liquid crystal cell 11 of Example 1. Table 1 shows the orientation state of the liquid crystal molecules. It is understood from FIG. 6 and Table 1 that the liquid crystal cell 11 of Example 1 is in a thermally stable bend orientation even under no voltage applied and has electro-optic characteristics at least equivalent to those of the liquid crystal cell of Comparative Example 1. Almost no color change was observed even when the liquid crystal cell 11 of Example 1 was pressed with a pen or the like. More specifically, because a number of unit walls of a polymer wall 18 were formed, the liquid crystal cell 11 of Example 1 withstood an external force such as a pen pressure. In the case of Comparative Example 1 having no polymer walls, a non-uniform display results.

TABLE 1

|  | Example 1 | Example 2 | Example 3 | Comparative Examples 3 and 4 | Comparative Example 5 |
| --- | --- | --- | --- | --- | --- |
| Orientation state | bend | bend | bend | spray | vertical |

In order to evaluate the adhesion between the polymer wall 18 and the substrates 12 and 13 of the liquid crystal cell 11 of Example 1, a square portion (size: 20 mm) containing only the polymer wall 18 and the liquid crystal regions 19 was cut off the liquid crystal cell 11. One of the substrates 12 and 13 was pulled; however, it was not easily peeled off. On the other hand, no polymer wall was formed in the liquid crystal cell of Comparative Example 1, so that the substrates peeled off from each other while a square portion (size: 20 mm) was being cut off the liquid crystal cell.

Figure 7:
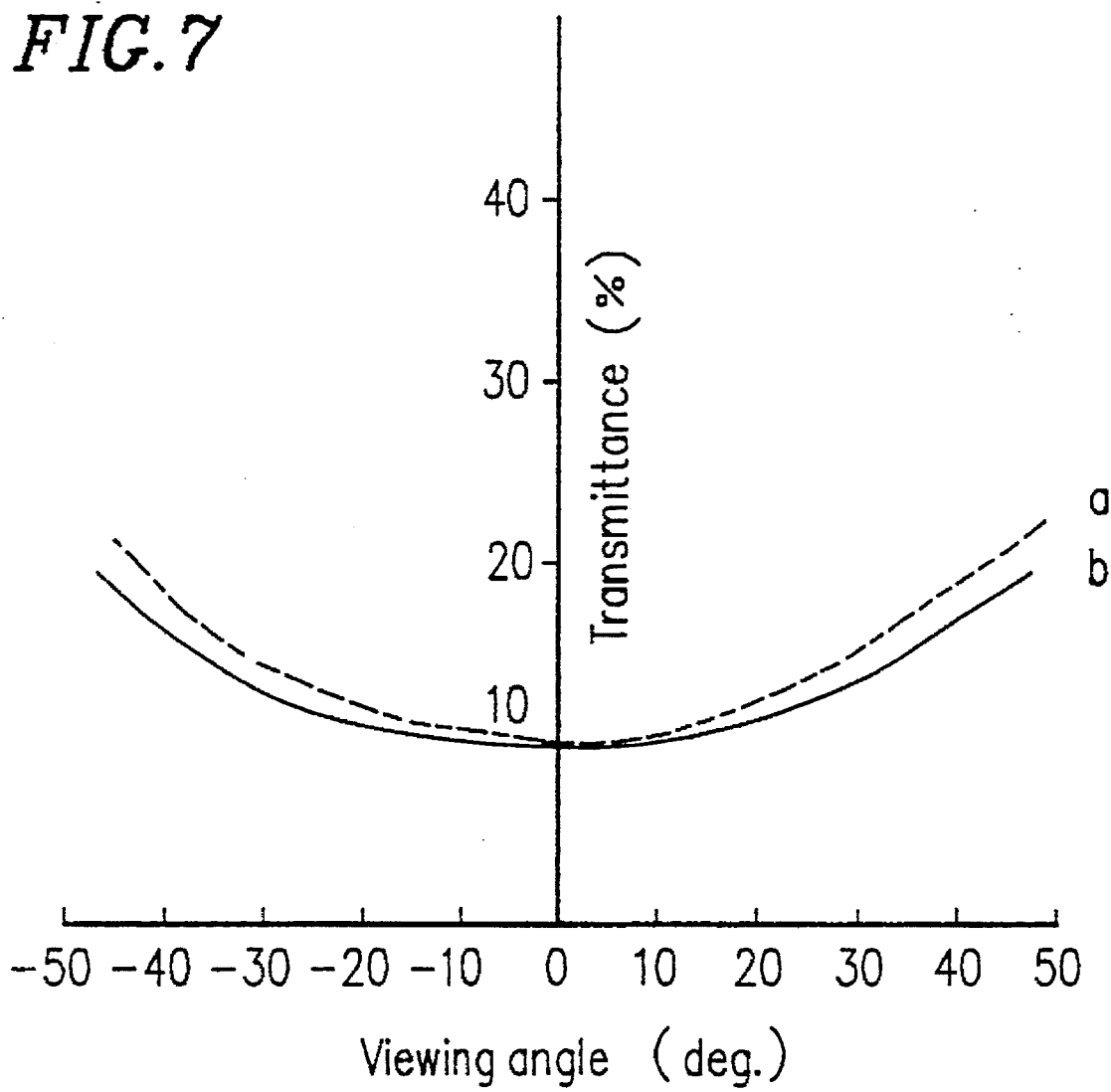
FIG. 7 is a graph for describing viewing angle characteristics in the case where a mono-axial optical compensated film is provided for the liquid crystal display device produced according to Example 1 of the present invention.

A mono-axial optical compensated film 26 having a phase difference of 655 nm as shown in FIG. 1A was provided between the polarizer 24 and the substrate 12 in such a manner that the optical axis of the compensated film 26 constituted 90° with respect to the liquid crystal molecular axes. Viewing angle characteristics of the resulting cell were measured. FIG. 7 shows the results of the measurement, i.e., electro-optic characteristics of the cell such as the relationship between a viewing angle and light transmittance. It is understood from FIG. 7 that the viewing angle characteristics of the liquid crystal cell of Example 1 are omnidirectional owing to the compensated film 26.

Figure 8:
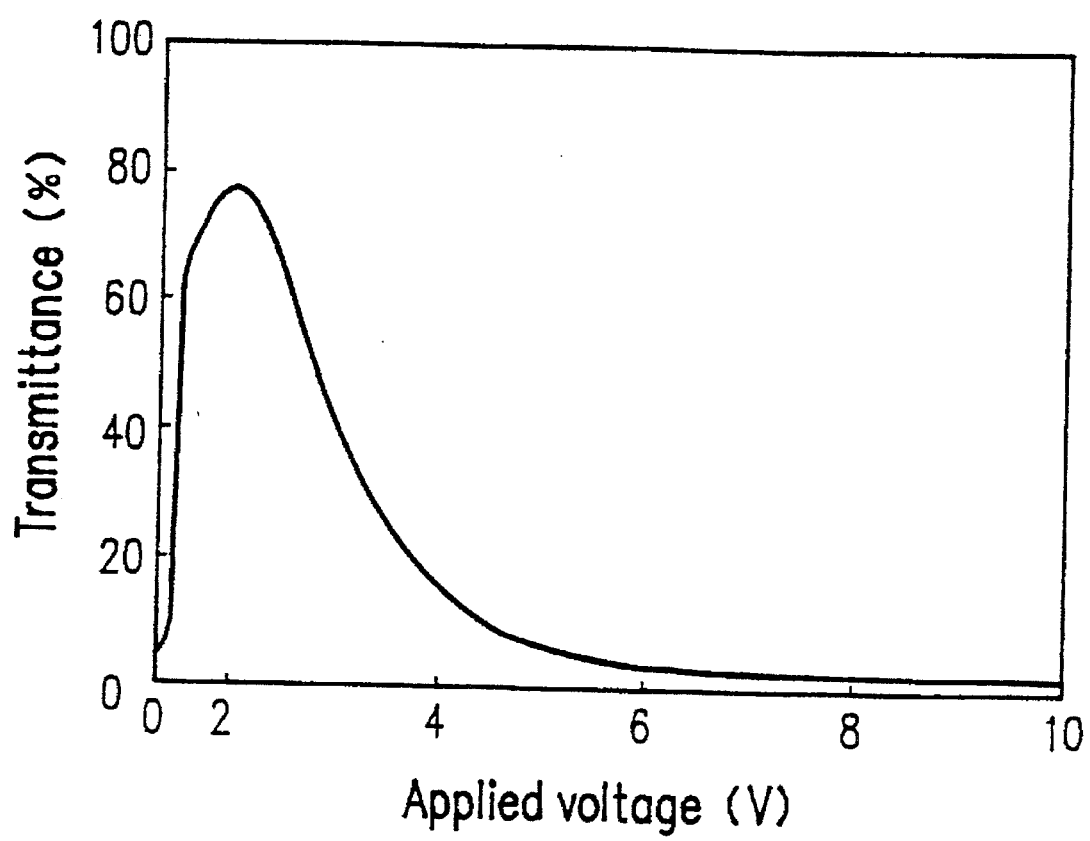
FIG. 8 is a graph showing electrooptical characteristics of a liquid crystal display device of Comparative Example 1.

FIG. 8 is a graph showing the relationship between an applied voltage and light transmittance of the liquid crystal cell of Comparative Example 1. As is understood from FIG. 8, the liquid crystal cell of Comparative Example 1 shifted from a spray orientation state to a bend orientation state at a certain voltage. When the liquid crystal cell of Comparative Example 1 was shifted from a voltage applied state to a non-voltage applied state, the liquid crystal molecules gradually shifted from a bend orientation state to a spray orientation state. Furthermore, when the liquid crystal cell of Comparative Example 1 was pressed with a pen, non-uniform display easily resulted at the peripheral region of the pen-pressed portion.

COMPARATIVE EXAMPLE 2

An empty cell was fabricated in the same manner as in Example 1. The same mixture as that of Example 1 was injected into the empty cell. Then, the empty cell was irradiated with UV-rays under the same conditions as in Example 1, except that a photomask was not used, thus, a liquid crystal cell was fabricated. The electro-optic characteristics of the liquid crystal cell thus produced are shown in Table 2. An observation of the liquid crystal cell using a polarization microscope revealed that a polymer wall was formed in the pixels. This caused the decrease in contrast as described above.

TABLE 2

|  | Example 1 | Comparative Example 2 |
| --- | --- | --- |
| Transmittance at 10 V | 8% | 25.% |

EXAMPLES 2 AND 3, AND COMPARATIVE EXAMPLES 3, 4, AND 5

Empty cells were fabricated in the same way as in Example 1. The following voltages were applied to these empty cells while effecting a polymerization: 0 volt (Comparative Example 3); ±1 volt (Comparative Example 4); ±3 volts (Example 2); ±5 volts (Example 3); and ±25 volts (Comparative Example 5). The orientation state of liquid crystal molecules of each liquid crystal cell was inferred based on their electro-optic characteristics (relationship between an applied voltage and light transmittance), as shown in Table 1. In Comparative Example 5, almost no change in the light transmittance was caused by the application of a voltage. Thus, it is inferred that the liquid crystal molecules were aligned vertically.

EXAMPLE 4

Figure 9:
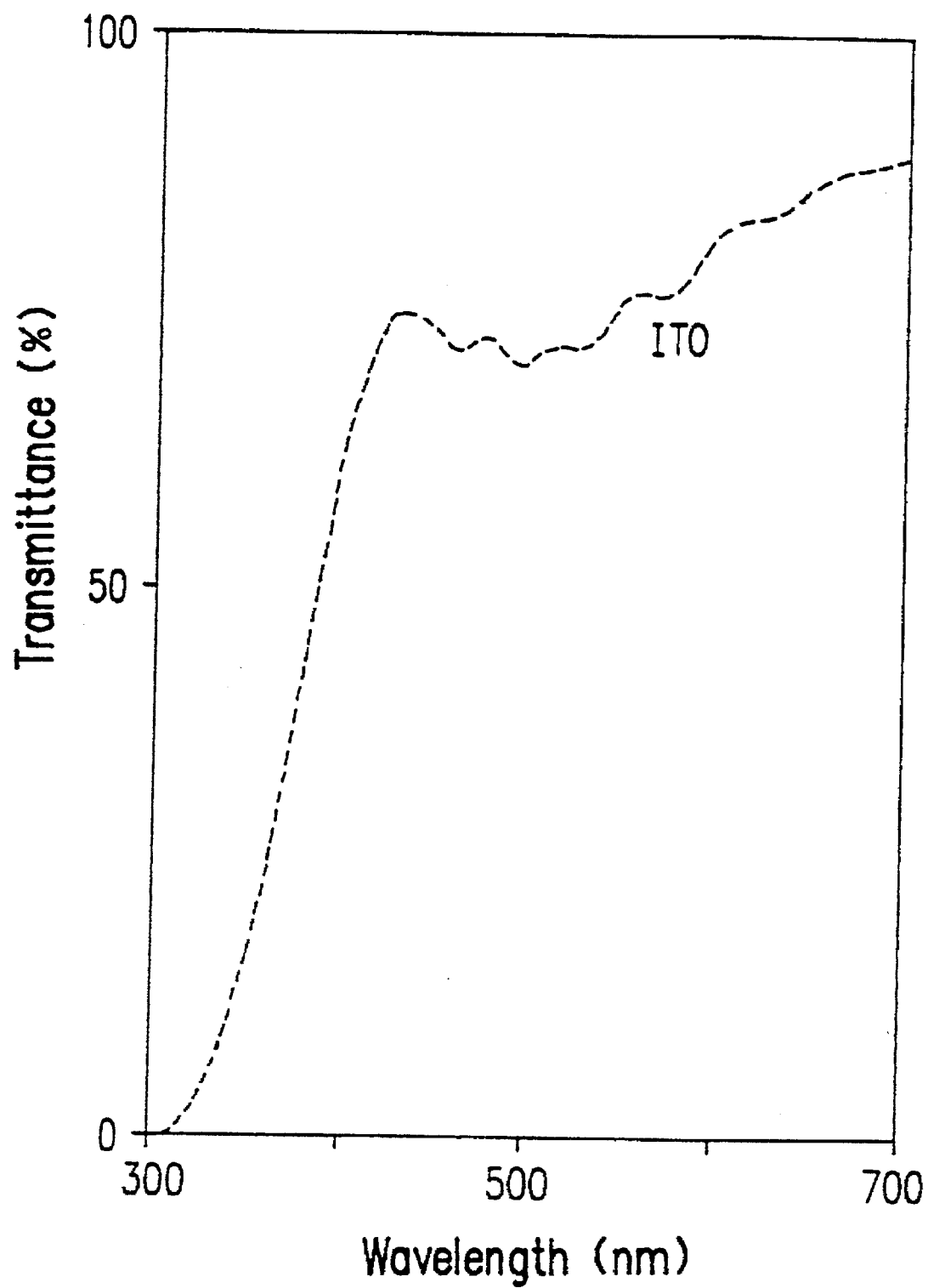
FIG. 9 is a graph showing an absorption curve of a plastic substrate used in Example 4 of the present invention.

Two acrylic plastic substrates (thickness: 400 μm) with the same electrodes as those of Example 1 were prepared and subjected to an alignment treatment in the same manner as in Example 1. The substrates were attached to each other, and spacers having a particle size of 7 μm were injected between the substrates to form an empty cell. The same photomask as that of Example 1 was placed on the empty cell. FIG. 9 is a graph showing the relationship between an incident wavelength and light transmittance. As is understood from FIG. 9, the substrates partially blocked light having a wavelength of 350 nm or less.

Next, 0.10 g of R-684 (manufactured by Nippon Kayaku Co., Ltd.), 0.01 g of styrene, 0.75 g of Compound A represented by Formula IV, 0.14 g of isobornyl acrylate, 4 g of liquid crystal material E7 (manufactured by Merck & Co., Inc.), and 0.025 g of photopolymerization initiator (Lucirin TPO, manufactured by BASF; a local maximum light absorption in the vicinity of a wavelength: 400 nm) were homogeneously mixed. The mixture was injected into the empty cell in a vacuum. More specifically, the injection of the mixture was started under the conditions that the inside of the empty cell was at 100 Pa and the cell and the mixture were at 30° C. Shortly after the injection began, the substrates and an injection plate, which contained the mixture to be injected, were heated to 60° C.

The liquid crystal cell was heated to 100° C. and was continuously irradiated with UV-rays for 10 minutes under the same intensity of UV-rays and conditions as in Example 1, while a voltage of ±5 volts was applied between the transparent electrodes on the substrates. The cell was gradually cooled to 25° C. and was irradiated with UV-rays for another 3 minutes without removing the photomask. Thereafter, the cell was once heated to 100° C. and gradually cooled to 25° C. over 8 hours. The retardation ($\Delta n_1 \cdot d_1$) of the cell thus produced was 650 nm.

A pair of polarizers with polarization directions thereof crossing at right angles and a phase difference plate ($\Delta n_2 \cdot d_2$ = 655 nm) 26 having an optical phase compensation function were attached to the liquid crystal cell in the same manner as in Example 1 as shown in FIG. 1A. Thus, a polymer-matrix π cell was produced. The electro-optic characteristics of the cell thus produced were substantially the same as those of Example 1. In the present example, the optical compensated film 26 having the characteristics described above was provided between the substrate 12 and the polarizer 24.

EXAMPLE 5

Figure 10:
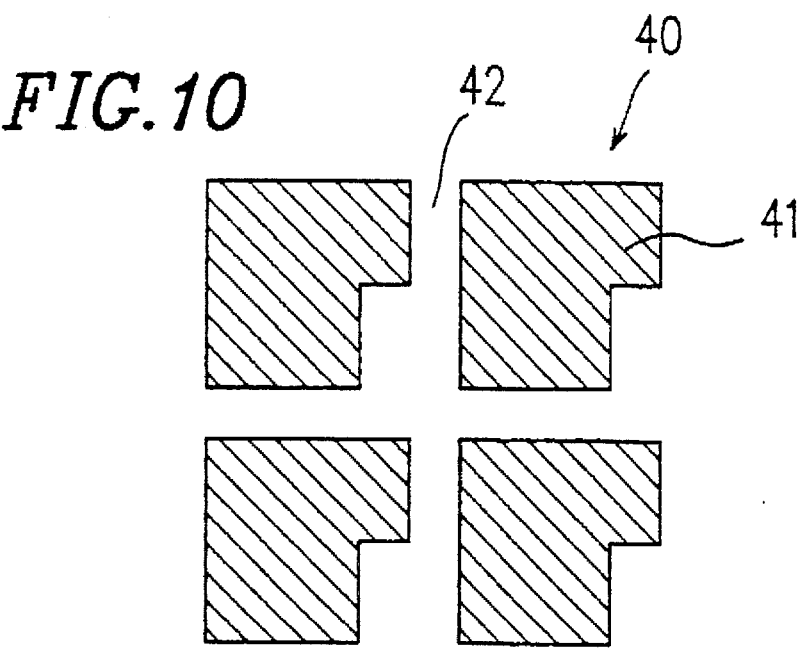
FIG. 10 is a plan view showing a color filter substrate used in Example 5 of the present invention.
Figure 11:
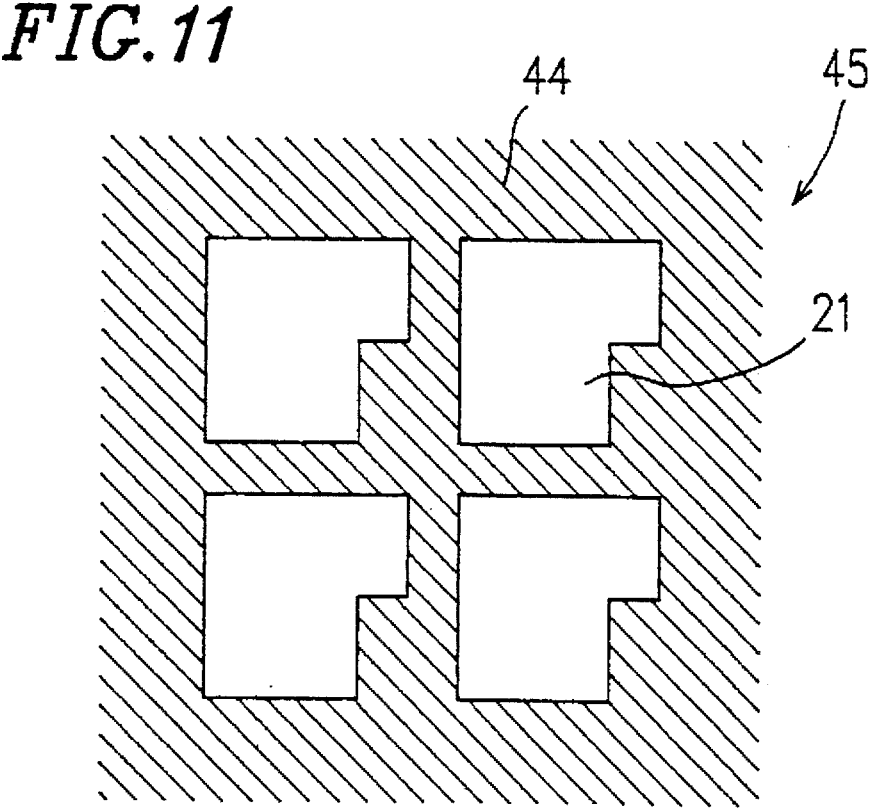
FIG. 11 is a plan view showing a TFT substrate used in Example 5 of the present invention, the TFT substrate being provided with a black mask.

In the present example, a color filter substrate 40 as shown in FIG. 10 and a TFT substrate 45 as shown in FIG. 11 were used. The color filter substrate 40 had color filters 41 corresponding to pixels and light transmitting regions 42 corresponding to portions other than the pixels. The TFT substrate 45 had display electrodes and the like formed in pixel regions 21 and a black mask 44 made of a black resin material formed in portions other than the pixel regions 21. The color filter substrate 40 and the TFT substrate 45 were subjected to an alignment treatment in the same manner as in Example 1 and were attached to each other under the same conditions as in Example 1. Then, the same mixture as that of Example 1 was injected between the color filter substrate 40 and the TFT substrate 45 in a vacuum. UV-rays were radiated through the color filter substrate 40 in the same manner as in Example 1 to give a TFT-polymer-matrix π cell. In the present example, the color filters were used to provide a regular distribution of UV-ray intensities.

In the present example, the liquid crystal was located closer to the photomask, i.e., the color filter substrate 40, by a thickness of the color filter substrate 40, as compared with Example 1. Therefore, polymer can be prevented from being formed in the pixel regions 21 by the diffraction of light caused by the photomask. In particular, the present example is applicable to a cell having small pixel regions 21. Furthermore, according to the present example, the step of attaching a separate photomask as used in Examples 1 through 4 can be omitted, so that a substantial decrease in cost can be achieved by the reduction of the number of components and production steps.

EXAMPLE 6

An empty cell was fabricated in the same way as in Example 1. Then, 0.10 g of R-684 (manufactured by Nippon Kayaku Co., Ltd.; refractive index: 1.5036), 0.10 g of p-fluorostyrene (refractive index: 1.515), 0.30 g of Compound A represented by Formula IV, 0.30 g of isobornyl acrylate (refractive index: 1.474) and 0.20 g of perfluorooctyl acrylate (refractive index: 1.334) as a polymerizable material, and liquid crystal material E7 were mixed and injected into the empty cell to form a liquid crystal cell in the same manner as in Example 1.

A pair of polarizers were attached to the liquid crystal cell in the same manner as in Example 1, and the electro-optic characteristics of the liquid crystal cell were measured. In the present example, in order to evaluate the level of light scattering at the interface between the liquid crystal and the polymer wall 18 in the pixel regions 21, lenses having different convergence angles (2.7° and 27°) were used. It can be seen that a lens having a larger convergence angle more readily converges light scattered from the liquid crystal cell. As the ratio ($R = T_{27}°/T_{2.7}°$) in a black state, i.e., in a saturated state becomes closer to 1, less light is scattered (where $T_{27}°$ represents a light transmittance obtained with the lens having a convergence angle of 27°, and $T_{2.7}°$ represents a light transmittance obtained with the lens having a convergence angle of 2.7°). In the present example, R was measured to be 1.1.

Only the polymerizable material was cured to become a polymer, and the refractive index of the polymer was measured. The refractive index of the polymer was 1.49 and the difference between the refractive index of the polymer and the ordinary refractive index $n_o$ (1.52) was 0.03. The measurement results of the present example are shown in Table 3 along with the measurement results of Example 1.

TABLE 3

|  | $|n_o - n_p|$ | R value |
| --- | --- | --- |
| Example 1 | 0.09 | 1.5 |
| Example 6 | 0.03 | 1.1 |

The liquid crystal cells of Examples 1 to 6 have improved characteristics compared with conventional examples as described below.

(i) The use of the polymer wall 18 partially or entirely surrounding the liquid crystal regions 19 prevents the interval between the substrates from being changed by an external force. In the liquid crystal cell of the present invention, the interval between the substrates is not changed even by an external force caused by the use of a pen or the like. This restrains the problem of a non-uniform display. Thus, the liquid crystal display device of the present invention can be used as a pen input device with the use of a pen input terminal. In that case, a transparent film for detecting a position is to be formed on the surface of the liquid crystal cell of each example, and the desired portion of the film for detecting a position is pressed with a pen or the like so as to input various commands.

(ii) The liquid crystal molecules 20 in the liquid crystal regions 19 are symmetrically aligned in each pixel region 21 with respect to a plane taken in the middle of and in parallel to the substrates 12 and 13. More specifically, the liquid crystal molecules 20 are in a self-compensated orientation state. Thus, the viewing angle characteristics of the liquid crystal cell of the present invention are improved. Furthermore, owing to the bend orientation of the liquid crystal molecules, the liquid crystal cell of the present invention has a fast response.

(iii) The liquid crystal cell of the present invention does not require the application of a voltage as is required in the initial orientation of a conventional $\pi$ cell. Driving methods used for an ordinary liquid crystal cell can be utilized for the liquid crystal cell of the present invention.

Because of the above-mentioned improved characteristics, the liquid crystal cells of the respective examples can be suitably used for portable display device requiring a pen input, display devices intended for a plurality of people, display devices with high definition large screens, and the like. Furthermore, the liquid crystal cells of the present invention can be used in fields in which the existing liquid crystal display devices are utilized. For example, the liquid crystal cells can be as used as flat display devices for personal computers or the like, liquid crystal TVs, portable display devices using film substrates, and goggle-like display devices.

EXAMPLE 7

A liquid crystal display device according to the present example has the same structure as that shown in FIG. 1B.

An ITO film (thickness: 500 Å) was formed as a transparent electrode on each of a pair of glass substrates (thickness: 1.1 mm), respectively. Polyimide, used as an alignment film, was spin-coated onto the respective ITO films on the glass substrates, and the polyimide thus coated was subjected to a rubbing treatment with nylon cloth in one direction. The resulting substrates were attached to each other in such a manner that the respective alignment directions were identical, and spacers having a particle size of 7 μm were injected between the substrates so as to form an empty cell.

A homogeneous mixture of 0.1% to 5% by weight of a polymer cross-linkable material (polymerizable material) including a liquid crystalline polymerizable compound having a functional group in molecules thereof and a liquid crystal material were capillary-injected into the empty cell. More specifically, 0.1 g of liquid crystalline polymerizable material X represented by Formula V, 0.02 g of p-phenylstyrene, 9.88 g of liquid crystal material E7 (manufactured by Merck & Co., Inc.; Δn: 0.225; homogenization temperature: 60.5° C.), and 0.04 g of photopolymerization initiator (Irgacure 651) were homogeneously mixed and capillary-injected into the empty cell.

Furthermore, the resulting cell was irradiated with UV-rays at 10 mW/cm² and 100° C. for 10 minutes under a high-pressure mercury lamp while a voltage of ±4 volts was applied between the substrates. Thus, the mixture was phase-separated into liquid crystal and a polymer to form a liquid crystal layer and polymer films 27. Thereafter, the cell was gradually cooled at 10° C./hr. to 25° C., at which liquid crystal took a nematic state. UV-rays were irradiated to the cell for another 3 minutes to polymerize the polymerizable material in the polymer films 27. During this cooling step, the liquid crystal molecules were aligned along the direction of the orientation force of the substrates to improve a display quality.

Even under no voltage applied, the above-mentioned liquid crystal regions had the same structure as that of a conventional $\pi$ cell shown in Comparative Example 6 in a bend orientation under an applied voltage. Furthermore, since the liquid crystalline polymerizable material was polymerized, the polymer films 27 contained a liquid crystalline polymer (liquid crystalline compound having a polymerizable functional group within molecules thereof) in a bend orientation.

Next, polarizers were attached to the cell in such a manner that the respective polarizers constituted 45° with respect to the rubbing directions of the substrates and the polarization directions of the polarizers crossed each other at 90°. Thus, a $\pi$ cell type liquid crystal display device was produced. More specifically, a pair of polarizers whose polarization directions constitute 90° were attached to the cell in such a manner that one of the polarization axes constitutes an angle of about 45° with respect to the rubbing direction of the substrate.

Figure 12:
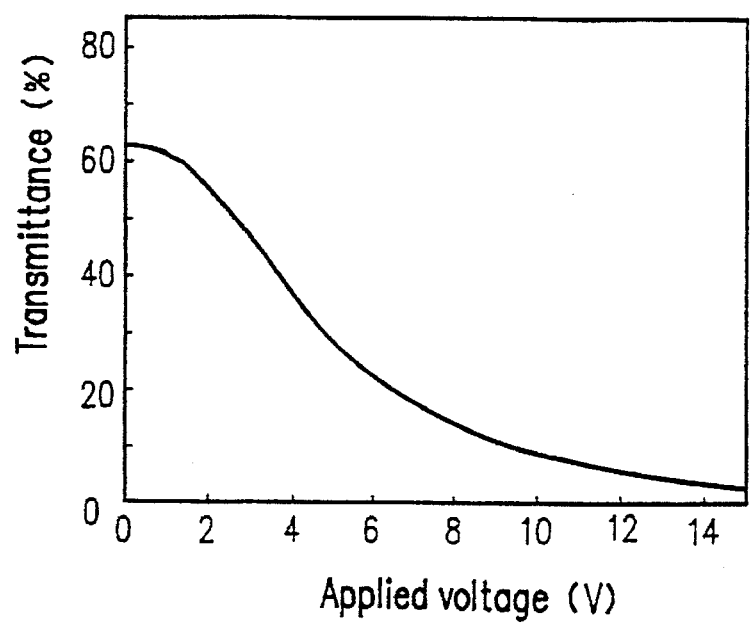
FIG. 12 is a graph showing electrooptical characteristics of a cell produced according to Example 7 of the present invention.

The electro-optic characteristics of the cell thus produced are shown in FIG. 12. It is understood from FIG. 12 that the application of a voltage for an initial orientation, as would be required for a conventional $\pi$ cell, was not necessary for the liquid crystal cell of the present example. Thus, the liquid crystal molecules of the liquid crystal cell in Example 7 had a bend orientation which was thermally stable even under no voltage applied, and had electro-optic characteristics (the relationship between an applied voltage and light transmittance) equivalent to those of Comparative Example 6.

A mono-axial optical compensated film having a phase difference of 655 nm was provided between the polarizer and the substrate in such a manner that the optical axis of the compensated film constituted 90° with respect to the liquid crystal molecular axes. It was confirmed that the resulting liquid crystal cell had broad viewing angle characteristics.

As described above, according to the present example, the mixture of 0.1% to 5% by weight of the polymer cross-linkable material and the liquid crystal material was phase-separated into the liquid crystal layer and the polymer films 27 under an applied voltage (i.e., $\pi$ cell orientation state). Therefore, the application of a voltage for an initial orientation, as would be required for the conventional $\pi$ cell, is not necessary for the present invention. As a result, the liquid crystal molecules can take a stable bend orientation state, and display characteristics such as the drive voltage and contrast of the cell become excellent.

Formula V

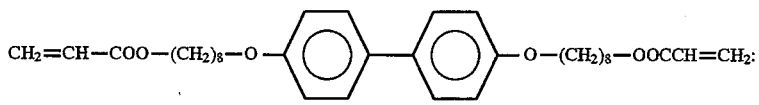

In the present example, at least one mono-axial optical compensated film was provided between either one of the polarizers and the liquid crystal layer in such a manner that the longitudinal axis direction of the liquid crystal molecules and the main axis of the compensated film crossed at right angles. It will be appreciated that a bi-axial optical compensated film may be used instead of the mono-axial optical compensated film.

COMPARATIVE EXAMPLE 6

An empty cell was fabricated in the same manner as in Example 7. Only the same liquid crystal material as that used in Example 7 was injected into the empty cell so as to form a liquid crystal cell. Then, polarizers were attached to the liquid crystal cell in the same manner as in Example 7 to form a conventional π cell.

Figure 13:
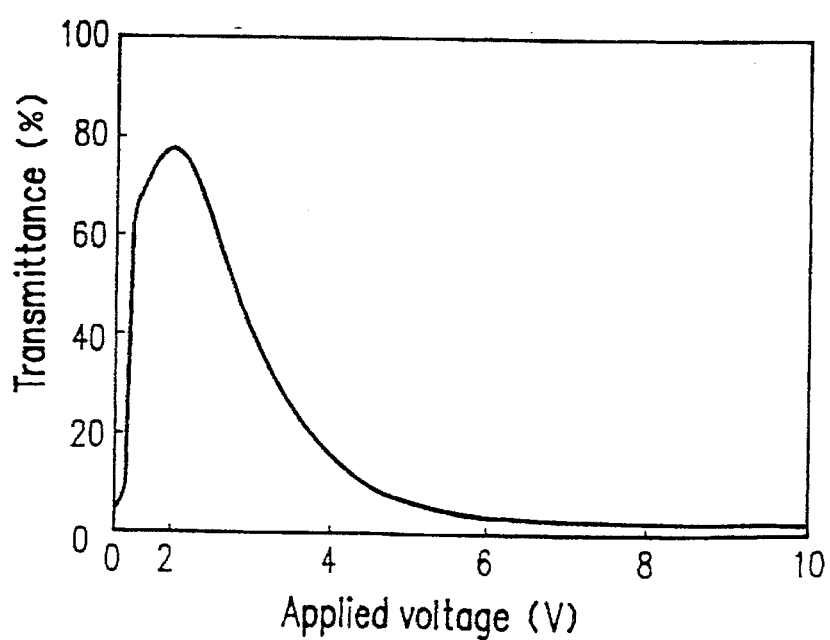
FIG. 13 is a graph showing electrooptical characteristics of a cell produced according to Comparative Example 6.
Figure 14A:
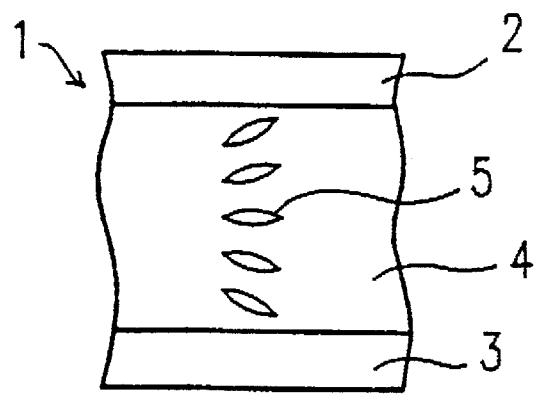
FIG. 14A is a cross-sectional view showing an orientation of liquid crystal molecules before the application of a voltage of a conventional π cell.
Figure 14B:
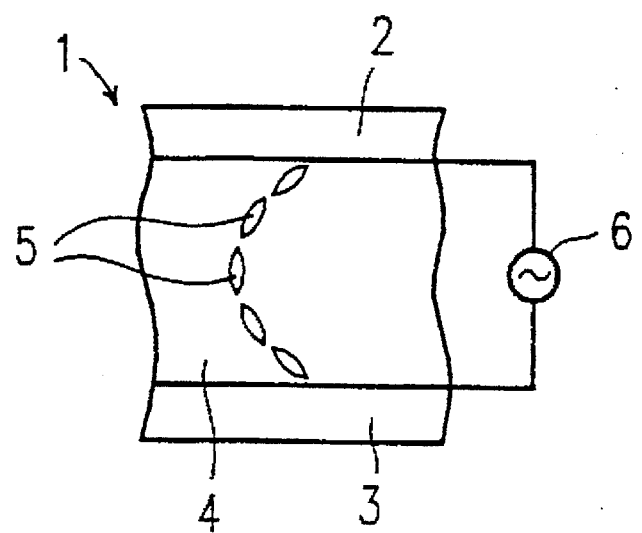
FIG. 14B is a cross-sectional view showing an orientation of liquid crystal molecules after the application of a voltage of a conventional π cell.

The electro-optic characteristics of the cell thus produced are shown in FIG. 13. As shown in FIG. 13, the liquid crystal molecules took a bend orientation by being applied with a certain voltage for a certain period of time. When the cell was shifted from a voltage applied state to a non-voltage applied state, the bend orientation relaxed into a spray orientation. Thus, it was found that the spray orientation was thermally stable under no voltage applied.

As described above, according to the present invention, conventional liquid crystal display devices of a π cell mode are quasi-solidified as micro-cells in the polymer matrix. Thus, the thickness of the liquid crystal cell of the present invention is not likely to be changed by external forces, and the cell can be used for pen-inputting operations without incorporating a protection film which would cause visual aberration between the display and the pen-input position. Furthermore, because of the polymer wall surrounding the liquid crystal regions that correspond to the pixels, liquid crystal display device is prevented from exhibiting non-uniform displays due to an external force. The liquid crystal display device can be used as a pen input liquid crystal display device with the use of a pen input terminal. Furthermore, the liquid crystal display device has a stable bend orientation state even under no voltage applied, so that any initial setting from the spray orientation to the bend spray orientation by the application of a voltage as in the conventional case is not required. Even when the liquid crystal display device is shifted from an ON-voltage state to an OFF-voltage state, the relaxation of the bend orientation to the spray orientation does not occur. Furthermore, a high-speed response can be realized owing to the bend orientation. The liquid crystal molecules are omnidirectionally aligned by the use of the mono-axial optical compensated film or the bi-axial optical compensated film, so that excellent viewing angle characteristics can be obtained.

Taking advantage of the above-mentioned characteristics, the liquid crystal display device of the present invention can be used as a large-size high definition liquid crystal display device, a portable information terminal device, etc.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
   a pair of electrode substrates including a plurality of pixels arranged in a matrix shape and an electrode formed on a surface of each electrode substrate, at least one of the surfaces being subjected to a rubbing treatment;
   a wall-like structure formed between the pair of electrode substrates, the wall-like structure including unit walls, and each unit wall corresponding to one of the plurality of pixels; and
   a liquid crystal layer at least partially partitioned by the wall-like structure and including liquid crystal regions between the pair of electrode substrates, each liquid crystal region corresponding to one of the plurality of pixels, wherein liquid crystal molecules in the liquid crystal regions have a plane-symmetrical bend orientation with respect to a plane taken in the middle of and in parallel to the electrode substrates.

2. A liquid crystal display device according to claim 1, wherein the pair of electrode substrates are in close contact with the wall-like structure.

3. A liquid crystal according to claim 1, wherein a liquid crystalline polymer material is included in a material constituting the wall-like structure.

4. A liquid crystal display device according to claim 1 further comprising a pair of polarizers, each polarizer being formed on the surface of one of the pair of electrode substrates, and respective polarizing axes of the polarizers being perpendicular to each other,
   wherein the polarizing axis of one of the pair of polarizers is at 45° with respect to a direction in which the rubbing treatment is conducted for the electrode substrates.

5. A liquid crystal display device according to claim 4 further comprising a mono-axial optical compensated film between the liquid crystal layer and one of the pair of polarizers, a main axis of the mono-axial optical compensated film being perpendicular to a longitudinal axis direction of the liquid crystal molecules, and the mono-axial optical compensated film having a retardation equal to d•Δn, wherein d represents a thickness of the liquid crystal layer and Δn represents an effective anisotropy of refractive index of the liquid crystal layer.

6. A liquid crystal display device according to claim 4 further comprising a bi-axial optical compensated film between the liquid crystal layer and one of the pair of polarizers, a main axis of the bi-axial optical compensated film being perpendicular to a longitudinal axis direction of the liquid crystal molecules, and the bi-axial optical compensated film having a retardation equal to d•Δn, wherein d represents a thickness of the liquid crystal layer and Δn represents an effective anisotropy of refractive index of the liquid crystal layer.

7. A liquid crystal display device according to claim 1, wherein a material for at least one of the pair of electrode substrates is a polymer material capable of transmitting visible light at least in some wavelengths.

8. A liquid crystal display device according to claim 1, wherein an ordinary refractive index $n_o$ and an extraordinary refractive index $n_e$ of a liquid crystal material constituting the liquid crystal layer, and a refractive index $n_p$ of the material constituting the wall-like structure satisfies the following relationship:

$$|(n_e \text{ or } n_o) - n_p| \leq 0.1.$$

9. A method for producing a liquid crystal display device comprising: a pair of electrode substrates including a plurality of pixels arranged in a matrix shape, at least one of the electrode substrates being transparent; a polymer wall including unit walls, each unit wall corresponding to one of the plurality of pixels; and a liquid crystal layer at least partially partitioned by the polymer wall and including liquid crystal regions between the pair of electrode substrates, each liquid crystal region corresponding to one of the plurality of pixels, liquid crystal molecules in the liquid crystal regions having a plane-symmetrical bend orientation with respect to a plane taken in the middle of and in parallel to the electrode substrates wherein the method comprises the steps of:

injecting a mixture of a liquid crystal material, a liquid crystalline compound having a polymerizable functional group within molecules thereof, a polymerizable compound, and a photopolymerization initiator between the pair of electrode substrates, at least one of surfaces of the electrode substrates being subjected to a rubbing treatment; and irradiating a liquid crystal cell including the pair of electrode substrates and the mixture with light having a regular spatial distribution of intensities of high and low so as to correspond to the plurality of pixels, while applying at least one of an electric field and a magnetic field, whereby liquid crystal and a polymer material are phase-separated through a photopolymerization reaction so as to form the liquid crystal layer and the polymer wall, respectively.

10. A method according to claim 9, wherein the light having a regular spatial distribution of intensities of high and low is generated by means of a photomask.

11. A method according to claim 9, wherein the mixture present in the liquid crystal cell including the pair of electrode substrates and the mixture is subjected to a photopolymerization by using the light having a regular spatial distribution of intensities of high and low at a temperature equal to or greater than a homogenization temperature of the liquid crystal material, and thereafter is cooled while applying at least one of an electric field and a magnetic field.

12. A method according to claim 11, wherein the liquid crystal cell is irradiated with light again after the cooling.

13. A liquid crystal display device comprising a display medium including a pair of opposing electrode substrates, a liquid crystal layer interposed between the pair of electrode substrates, and a polymer layer, wherein liquid crystal molecules in the liquid crystal layer have a bend orientation so as to be plane-symmetrical with respect to a plane taken in the middle of and in parallel to the electrode substrates, the polymer layer including a cross-linked polymer in an amount of 0.1% to 5%, by weight, based on the display medium.

14. A liquid crystal display device according to claim 13, wherein the cross-linked polymer includes a liquid crystalline compound having a polymerizable functional group within molecules thereof.

15. A liquid crystal display device according to claim 13 further comprising: a pair of polarizers, each polarizer being formed on a surface of one of the pair of electrode substrates, and respective polarizing axes of the polarizers being perpendicular to each other; and a mono-axial optical compensated film provided between the liquid crystal layer and one of the pair of polarizers, a main axis of the mono-axial optical compensated film being perpendicular to a longitudinal axis direction of the liquid crystal molecules, wherein the polarizing axis of one of the pair of polarizers is at 45° with respect to a direction in which the rubbing treatment is conducted for the electrode substrates.

16. A liquid crystal display device according to claim 13 further comprising: a pair of polarizers, each polarizer being formed on a surface of one of the pair of electrode substrates, and respective polarizing axes of the polarizers being perpendicular to each other; and a bi-axial optical compensated film provided between the liquid crystal layer and one of the pair of polarizers, a main axis of the bi-axial optical compensated film being perpendicular to a longitudinal axis direction of the liquid crystal molecules, wherein the polarizing axis of one of the pair of polarizers is at 45° with respect to a direction in which the rubbing treatment is conducted for the electrode substrates.

17. A method for producing a liquid crystal display device comprising a display medium including a pair of opposing electrode substrates, a liquid crystal layer interposed between the pair of electrode substrates, and a polymer layer, wherein liquid crystal molecules in the liquid crystal layer have a bend orientation so as to be plane-symmetrical with respect to a plane taken in the middle of and in parallel to the electrode substrates, wherein the method comprises the steps of:

injecting a mixture of 0.1% to 5% by weight of a polymer cross-linkable material including a liquid crystalline polymerizable compound having a functional group in molecules thereof and a liquid crystal material between the pair of electrode substrates, at least one of the electrode substrates being transparent; and phase-separating the liquid crystal layer and the polymer layer by applying at least one of light energy and heat energy to the mixture while stabilizing the bend orientation of the liquid crystal molecules by applying at least one of an electric field and a magnetic field.

18. A method for producing a liquid crystal display device comprising a display medium including a pair of opposing electrode substrates, a liquid crystal layer interposed between the pair of electrode substrates, at least one of the electrode substrates being transparent, and a polymer layer, where liquid crystal molecules in the liquid crystal layer have an initially unstable orientation, comprising the steps of:

injecting a mixture of a polymer cross-linkable material including a liquid crystalline polymerizable compound and a liquid crystal material between the pair of electrode substrates;

phase-separating the liquid crystal layer and the polymer layer by applying at least one of light energy and heat energy to the mixture while initially applying at least one of an electric field and a magnetic field to stabilize the initial unstable orientation of liquid crystal molecules using the polymer layer formed as a result of the phase separation process;

removing application of the at least one of the electric and magnetic fields; and maintaining the stabilized orientation of the liquid crystal molecules after the at least one of the electric and magnetic fields is removed.

19. The method in claim 18, wherein during the phase separating step, the polymer layer formed on a surface of one of the electrode substrates includes liquid crystal molecules having a tilt angle with respect to the substrate surface.

20. The method in claim 18, wherein when the at least one of the electric and magnetic fields is removed, the tilted liquid crystal molecules are fixed by the polymer layer such that the polymer layer including the fixed tilted liquid crystal molecules functions as an alignment layer to stabilize the bend orientation.

21. The method in claim 18, wherein the liquid crystal molecules have a plane-symmetrical bend orientation with respect to a plane taken in the middle of and in parallel to the electrode substrates.

22. The method in claim 19, wherein the liquid crystal molecules have a plane-symmetrical bend orientation with respect to a plane taken in the middle of and in parallel to the electrode substrates.

23. The method in claim 20, wherein the liquid crystal molecules have a plane-symmetrical bend orientation with respect to a plane taken in the middle of and in parallel to the electrode substrates.

* * * * *